June 10, 1947.  P. YUKOB  2,422,063
CUTTING SOLES AND THE LIKE
Filed Dec. 29, 1944  15 Sheets-Sheet 10

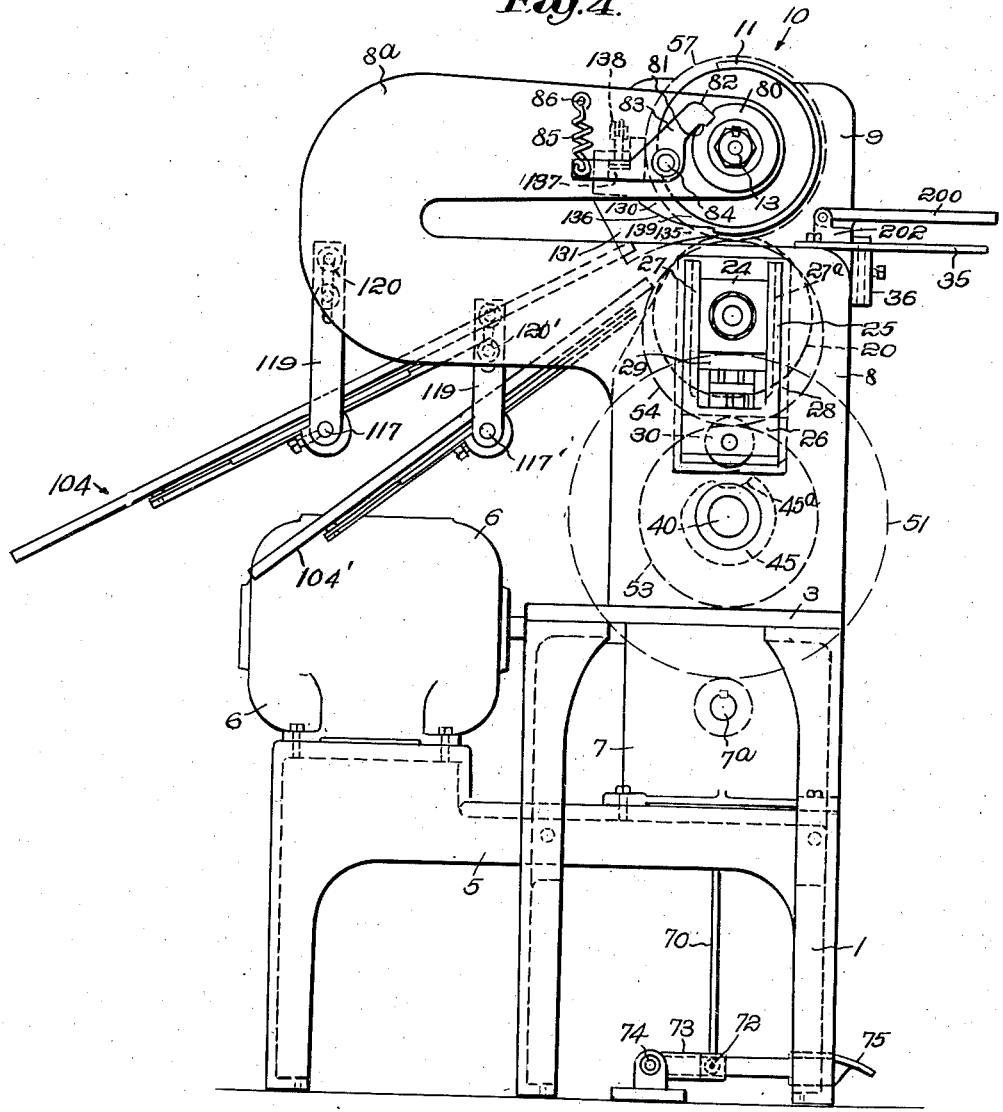

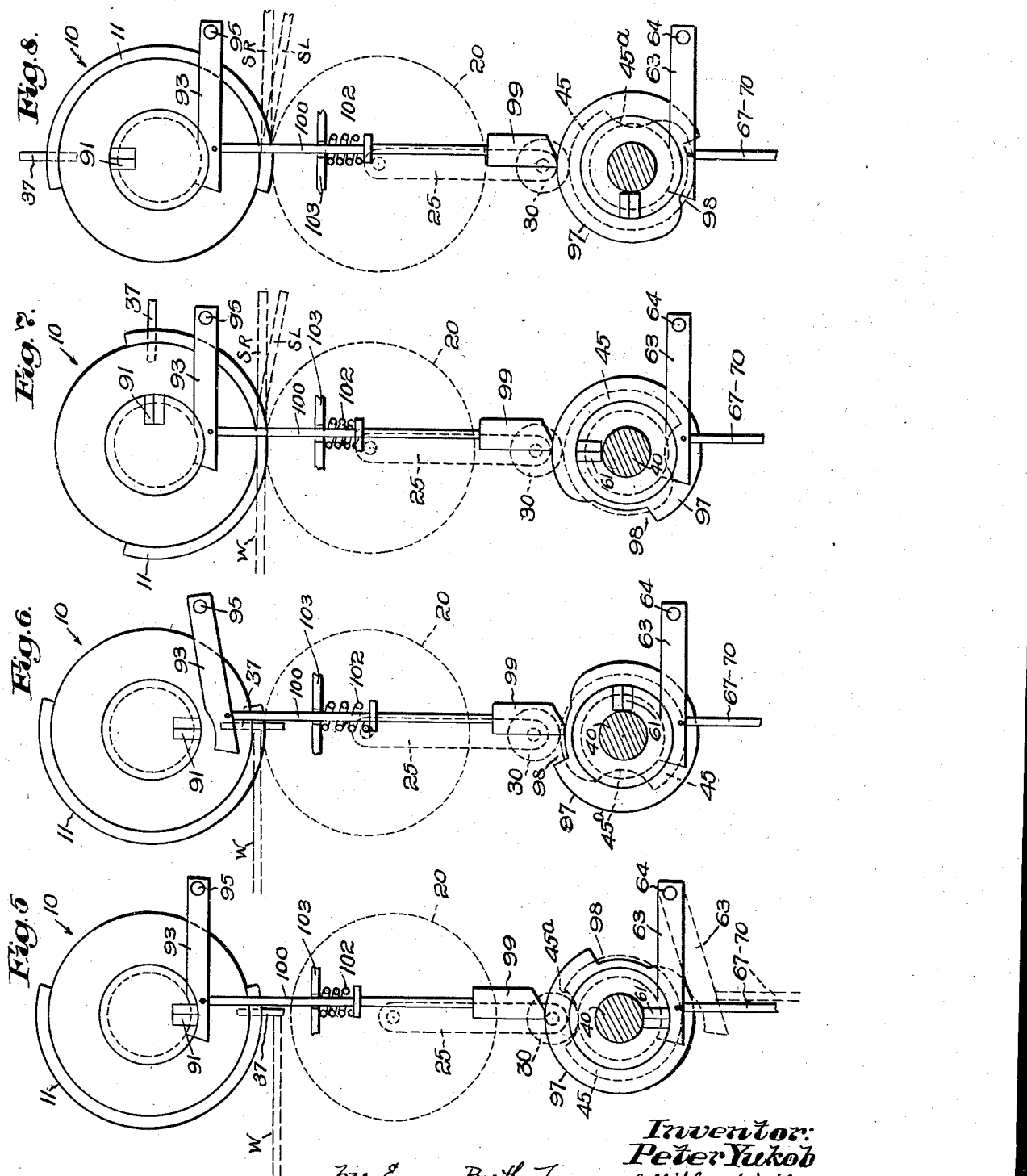

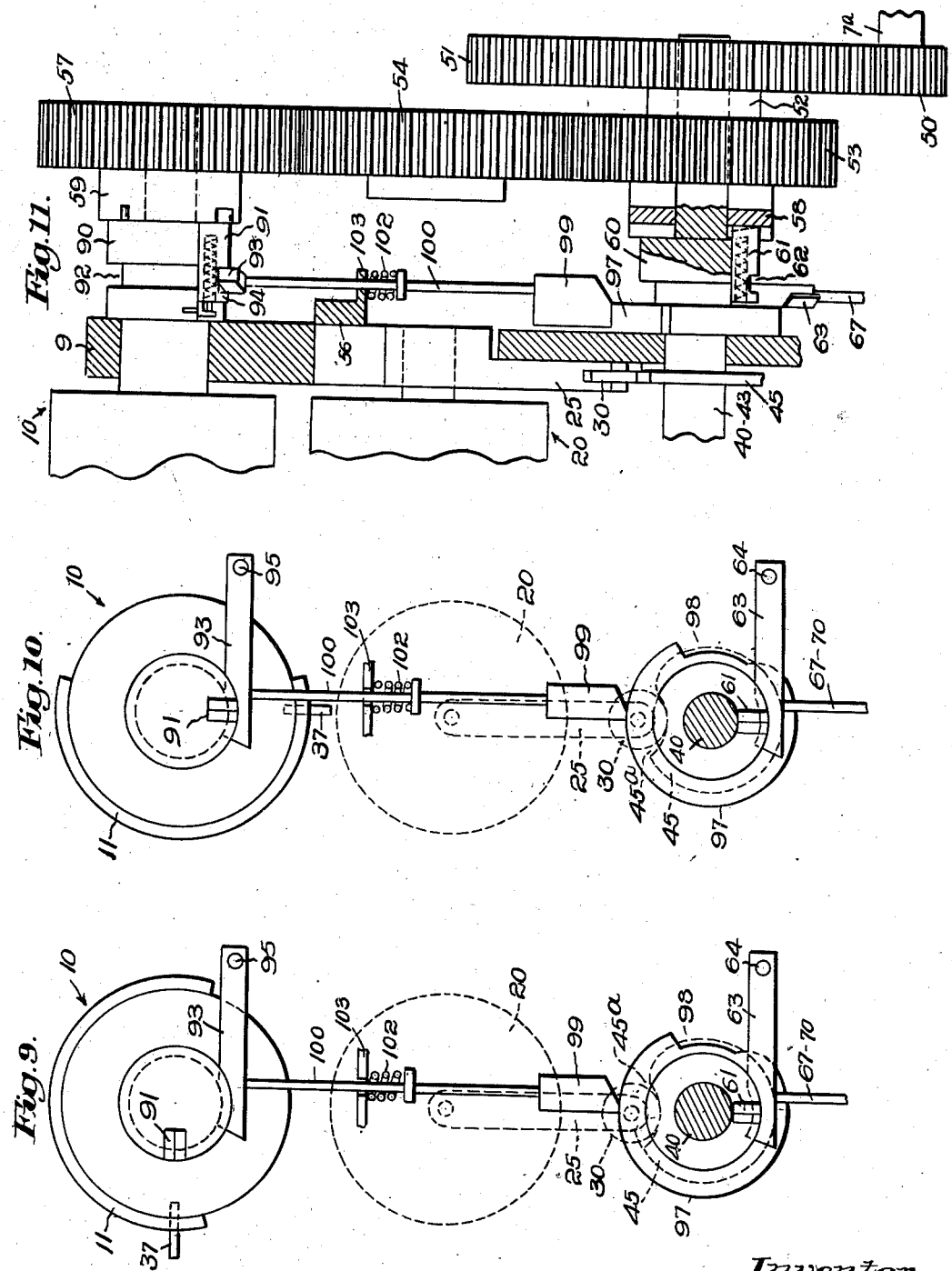

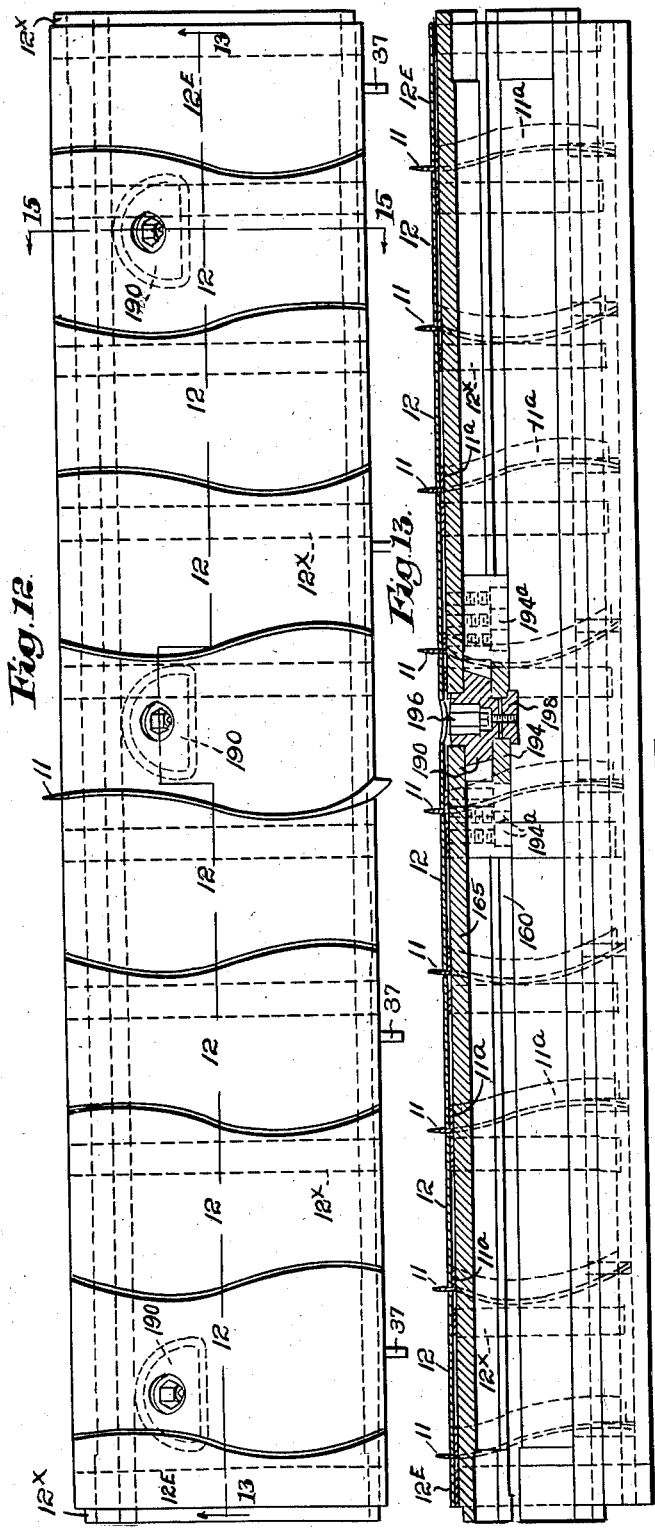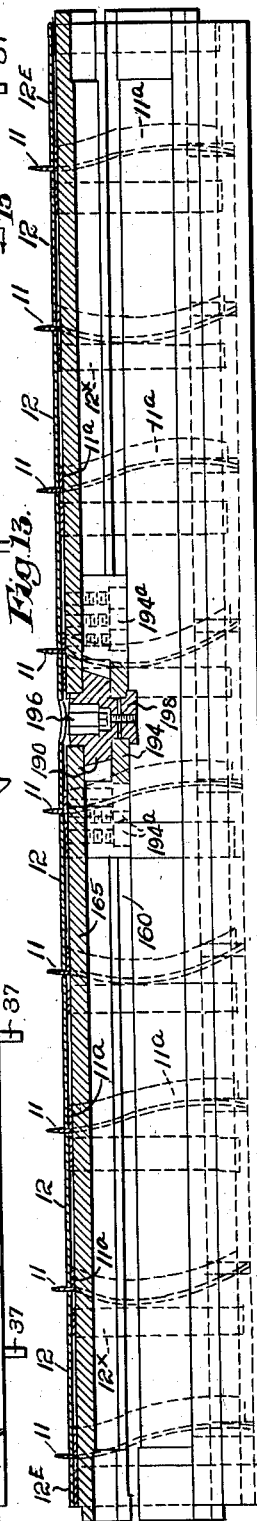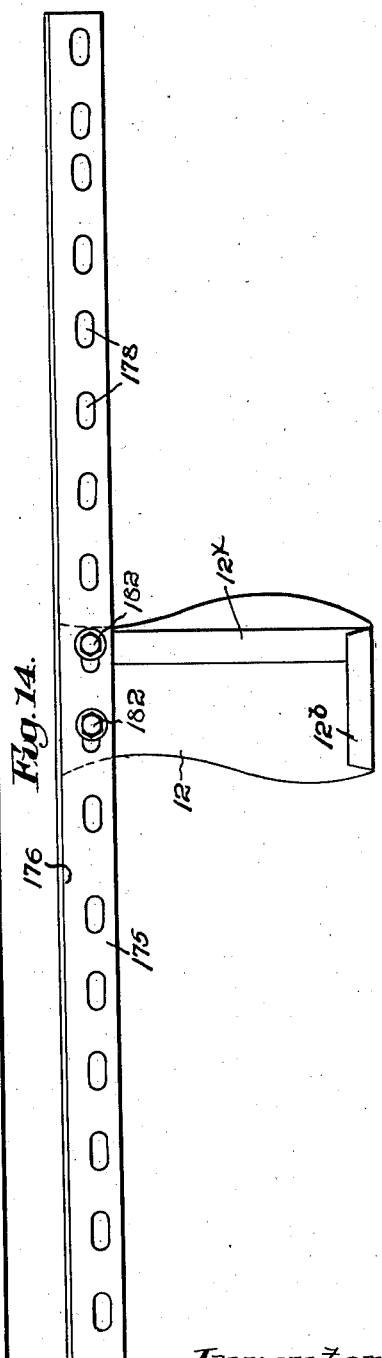

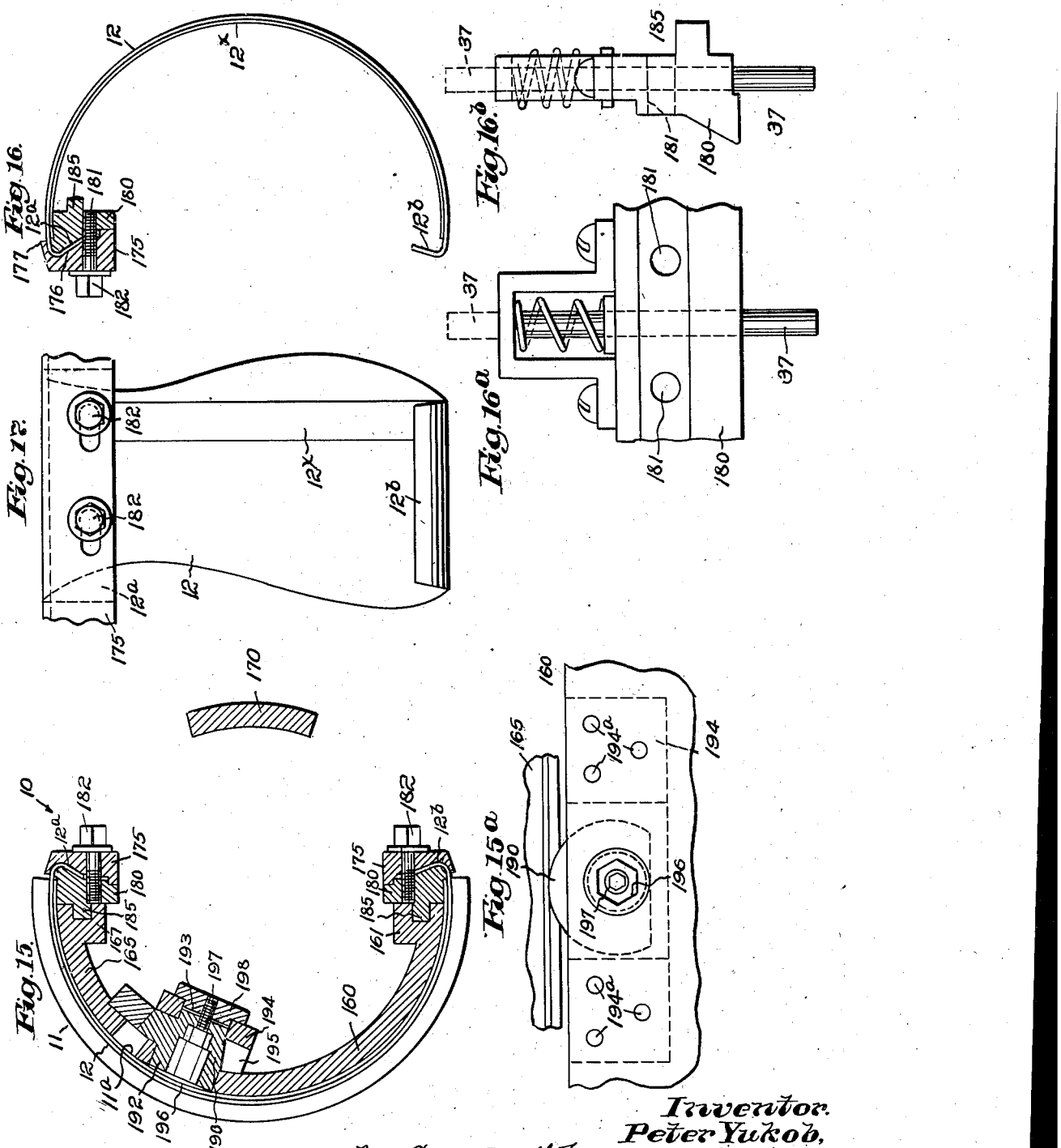

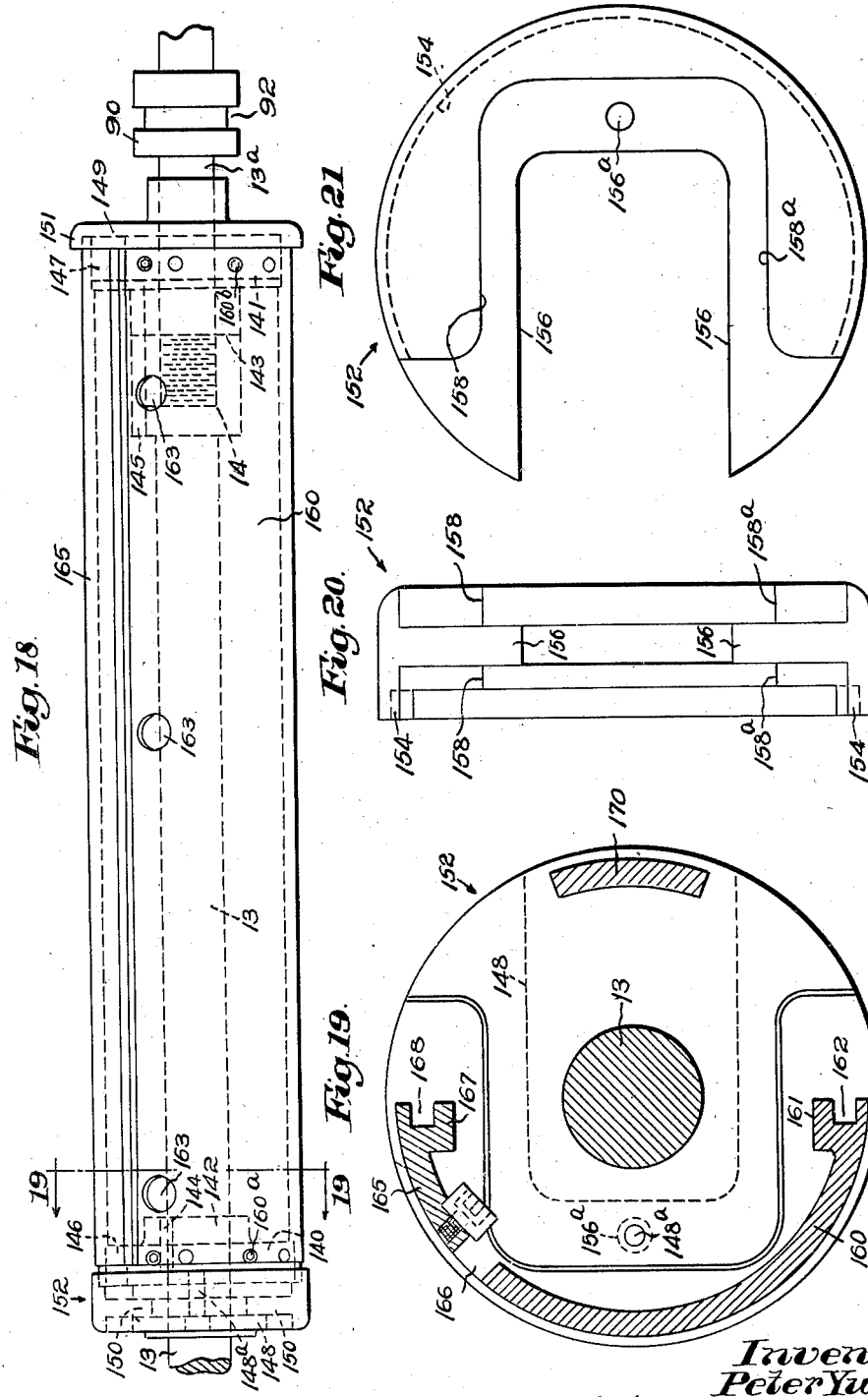

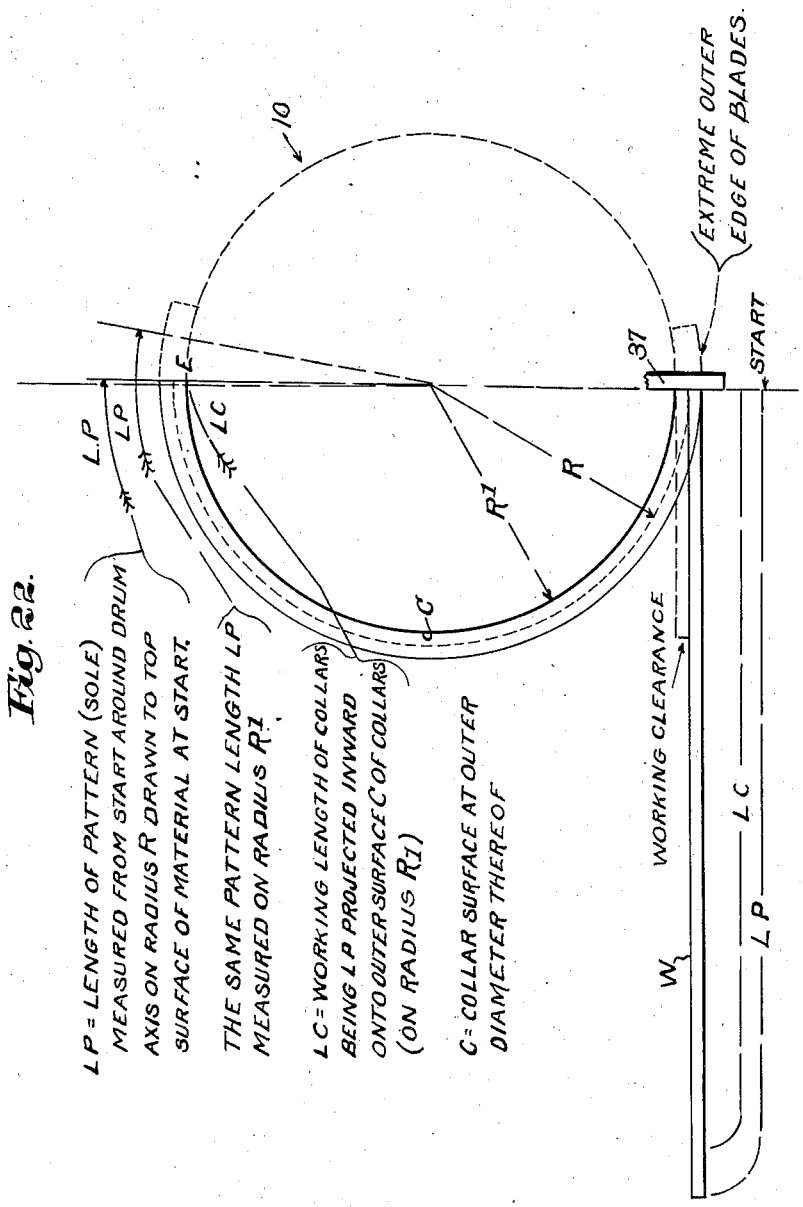

Fig. 22.

LP = LENGTH OF PATTERN (SOLE) MEASURED FROM START AROUND DRUM AXIS ON RADIUS R DRAWN TO TOP SURFACE OF MATERIAL AT START.

THE SAME PATTERN LENGTH LP MEASURED ON RADIUS $R_1$.

LC = WORKING LENGTH OF COLLARS BEING LP PROJECTED INWARD ONTO OUTER SURFACE C OF COLLARS (ON RADIUS $R_1$)

C = COLLAR SURFACE AT OUTER DIAMETER THEREOF

Inventor:
Peter Yukob.
by Emery, Booth, Townsend, Miller & Weidner
Attys.

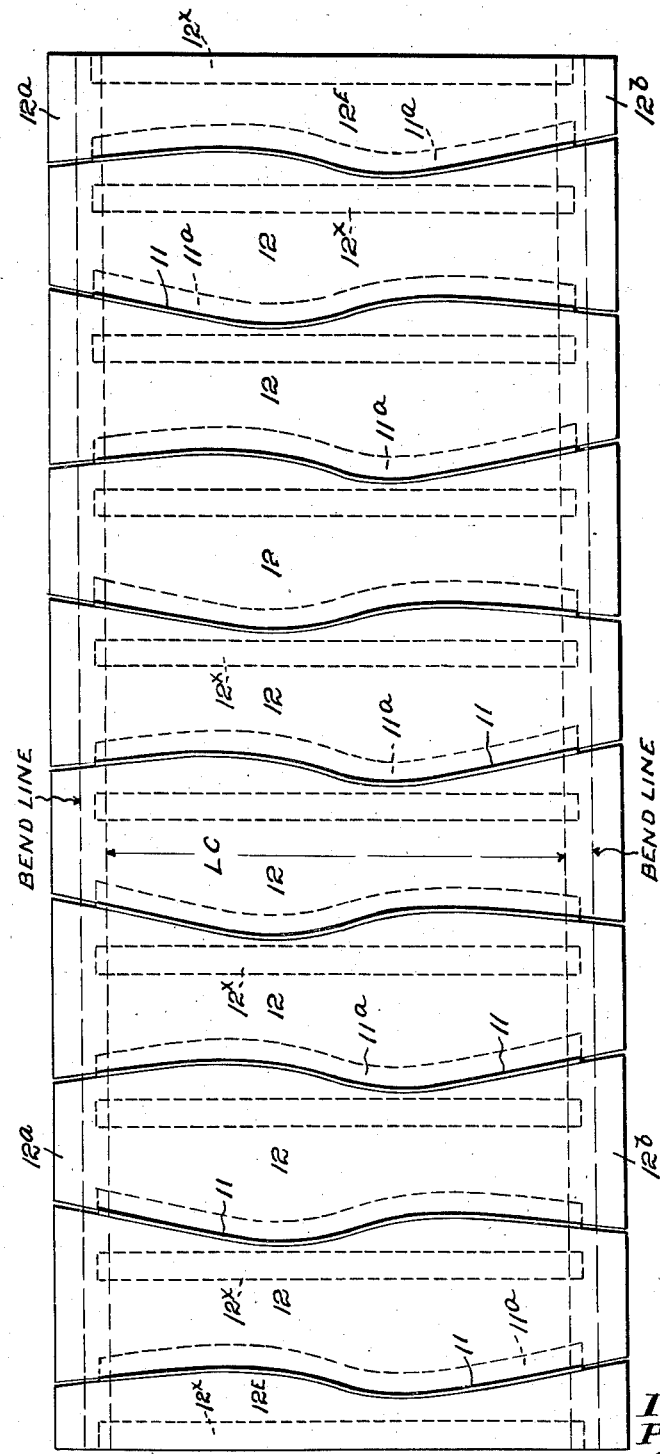

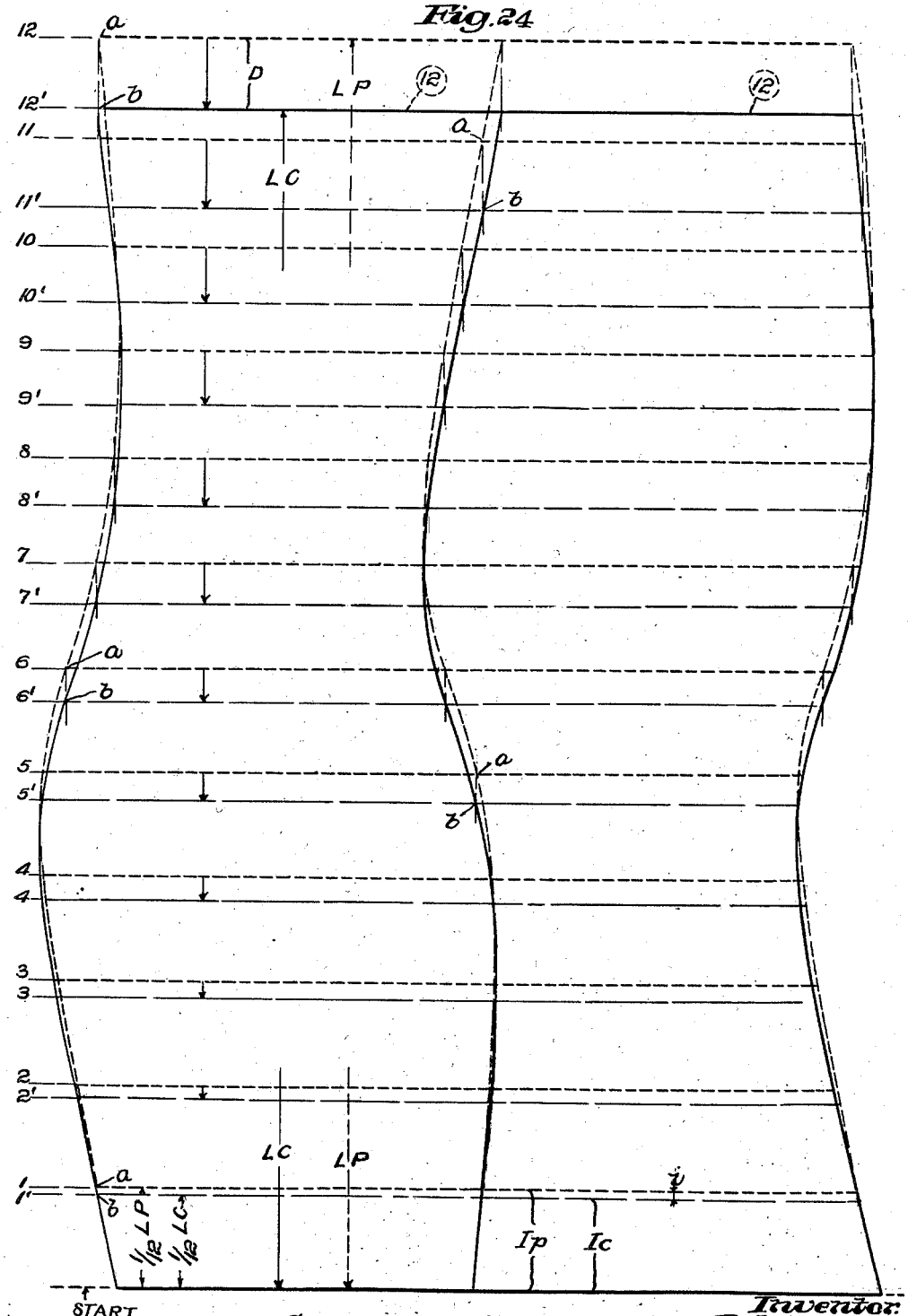

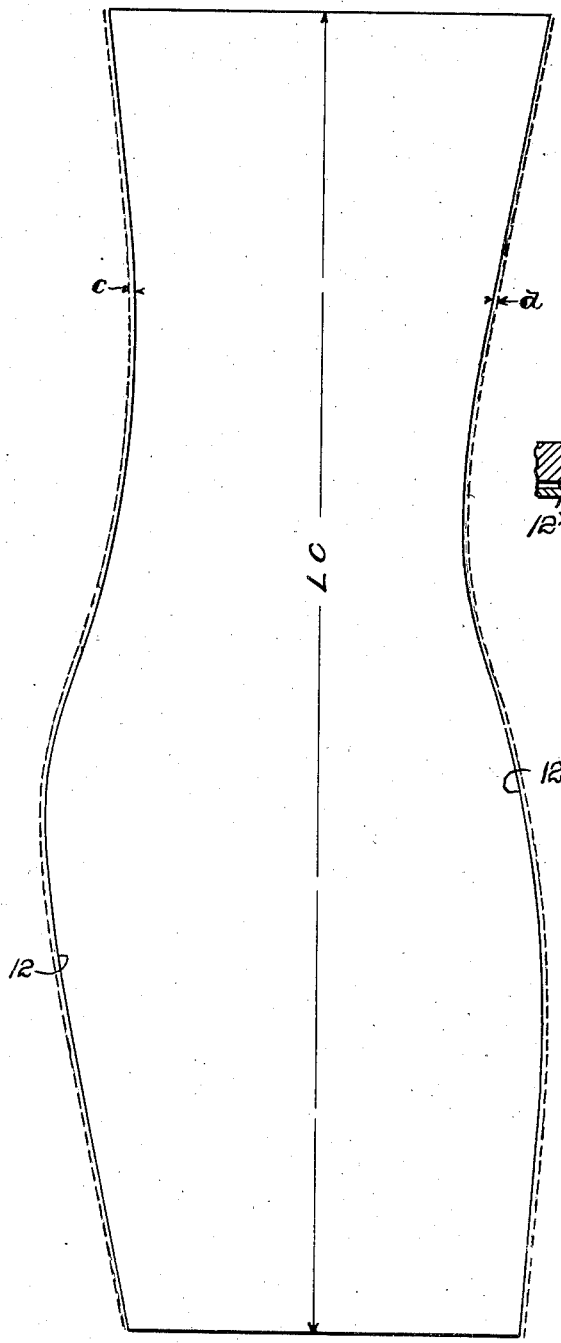
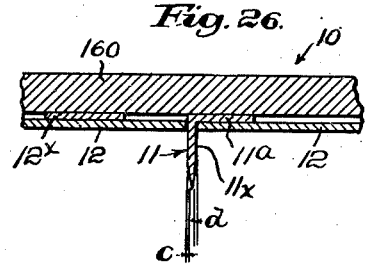

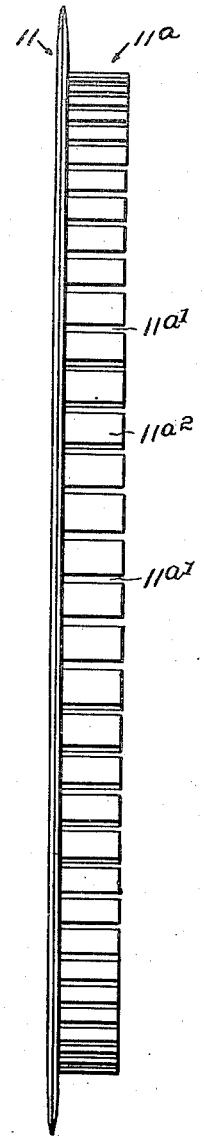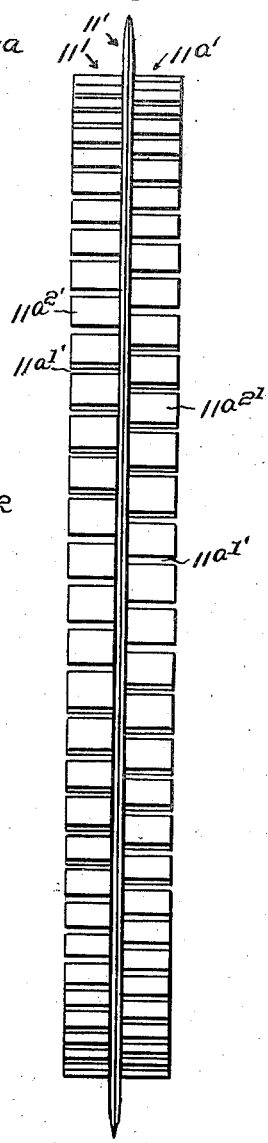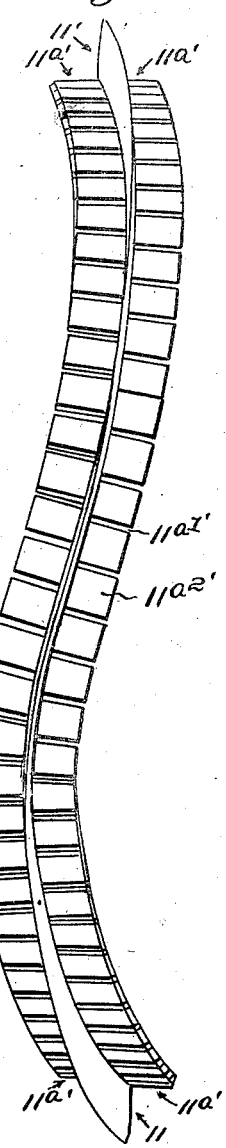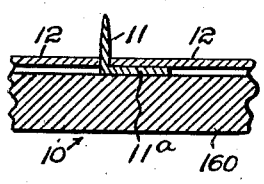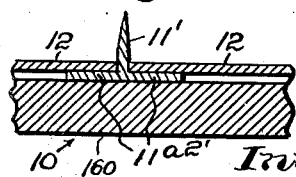

Patented June 10, 1947

2,422,063

UNITED STATES PATENT OFFICE 2,422,063

CUTTING SOLES AND THE LIKE

Peter Yukob, Lynn, Mass., assignor to Kistler, Lesh & Company, Incorporated, Boston, Mass., a corporation of Massachusetts Application December 29, 1944, Serial No. 570,411

26 Claims. (Cl. 164—28)

My present invention relates to multiple cutting of sheet material, particularly along curving pattern lines. The material concerned generally has substantial thickness and is more or less flexible, as for example natural leather from hides, and other materials and compositions suitable for shoe soles. While susceptible of use with various materials including rubber and rubber-like substances, plywood, linoleum and other compositions, the invention has its main application in the shoe and leather industry, especially in forming so-called block or cut soles from tanned leather strips.

The product articles involved generally have two opposite non-straight sinuous edges more or less conformant to the outline of the human foot in the case of shoe soles, in which the curve lines at the two sides, lengthwise of the foot, usually differ. For convenience in description the product articles are hereinafter generally referred to as soles, with the understanding that the invention is otherwise applicable to the simultaneous multiple cutting of flat products having a curved outline along one or both of two opposite side edges. The other or end edges of the articles, as at the heel and toe of soles, may be shaped, but for present purposes are assumed as straight, in accordance with the usual practice in block-cut soles. These are required in matching rights and lefts, each uniform in shape and dimension for any partciular size and type of sole.

In the manufacture of such soles, tanned leather hides are first cut into elongated strips having parallel straight side edges along their major dimension or length, and usually having irregular edges in the direction of their lesser dimension or width. Herein wherever these work strips are referred to the opposed straight and generally longer edges are termed the sides, the other two usually shorter and in most cases irregular edges being called the ends. With reference to these work strips, as contrasted with the soles to be cut from them, the soles extend with their lengths crosswise in the strips, that is, at right angles to the strip sides or approximately so.

The cutting of leather soles presents special problems, largely because hides and the leather strips formed from them are animal products and hence subject to wide variation in size, thickness, texture and surface irregularities such as brand marks, no two hides being exactly the same. Hides are apt to be thinner in the region of the hind quarters and thicker over the fore shoulders. Thick or thin spots and other irregularities appear at different locations in different hides and consequently also in the resulting leather strips from which the soles are to be cut. In dividing the hides into work strips such as here concerned, the strips are made as long as possible, for maximum economy of the material, and hence their ends usually are defined by the irregular borders of the hide.

The work strips are given a width accurately conforming to the length of the sole of the particular size and type desired. Here again it is important that the maximum number of soles of the given size be cut from the particular strip. To accomplish this the cut lines must be common to two adjacent soles, so that there is no wastage or scrap, even of small area, between adjoining soles. Since the strip ends generally are irregular it is inevitable that some quantity of scrap be formed there. In accordance with the invention even this end scrap is reduced to a minimum, yet with attendant safety for the operator of the machine.

The general practice in the cut sole industry is and for many years has been to form soles from the strips such as referred to by a reciprocatory chopping operation, the soles being cut singly, one curved edge at a time. The strips are presented to vertically descending chopper blades, with the narrower dimension or end of the strip foremost, so that the direction of strip advance for the successive cuts is lengthwise of the strip. One sole after another is chopped off at the leading portion of the strip, the latter being presented manually, in the lengthwise direction noted. The standard machine for thus cutting what are generally known as block soles from straight-sided leather strips and the method followed by them are known in the trade under the name Knox. A typical machine as referred to is that of Knox Patent No. 558,964 of 1896 and such patents as those to Quarmby Nos. 803,710 of 1905 and 1,191,344 of 1916.

Operators of these machines become skilled and work rapidly. But since the total cutting operation as to any given strip involves at least as many separate cutting actions (plus one) as the number of soles available from any given strip, the time and labor required is considerable. Another important consideration is the danger to the operator. In the use of the Knox-type machine the strip obviously becomes shorter as it is manually advanced through the knife position. Hence as the final sole is approached the length of the strip available to the operator for manipulating it becomes more and more limited, and he is required to push his fingers substantially up to the knife position. Despite all precautions accidents are frequent, and it is an accepted fact that few experienced cutters have all their fingers intact.

With these various problems and factors in mind, the present invention aims to provide methods and means whereby the cutting of block soles and analogous curved-edge articles from leather and other similarly thick sheet material may be simplified, expedited and otherwise improved, with substantial saving in time, labor and materials, and with increased safety to the operators. As will be apparent from the following description in connection with the drawings the method and means of the invention involves the adapting of a lineal knife to rotary cutting of leather and such sheet material of substantial thickness, whereby a plurality of articles such as shoe soles having sinuous side edges are adapted to be formed simultaneously in side by side relation and arranged as rights and lefts. Under the principles of the invention, each separate cut line except those at the ends of the strip is common to two adjacent soles, the work strip being presented sidewise, with the length and the side edges perpendicular to the path of advance. Each work strip receives a simultaneous multiple-sole progressive rotary cutting operation following an initial non-rotary cut-starting and material-locking action, one single such procedure completing the cutting of any given work strip.

In the drawings illustrating a machine and apparatus in accordance with the invention and adapted for the practice of the methods thereof:

Figs. 3 and 4 are right and left end elevations of said machine, respectively;

Figure 33:
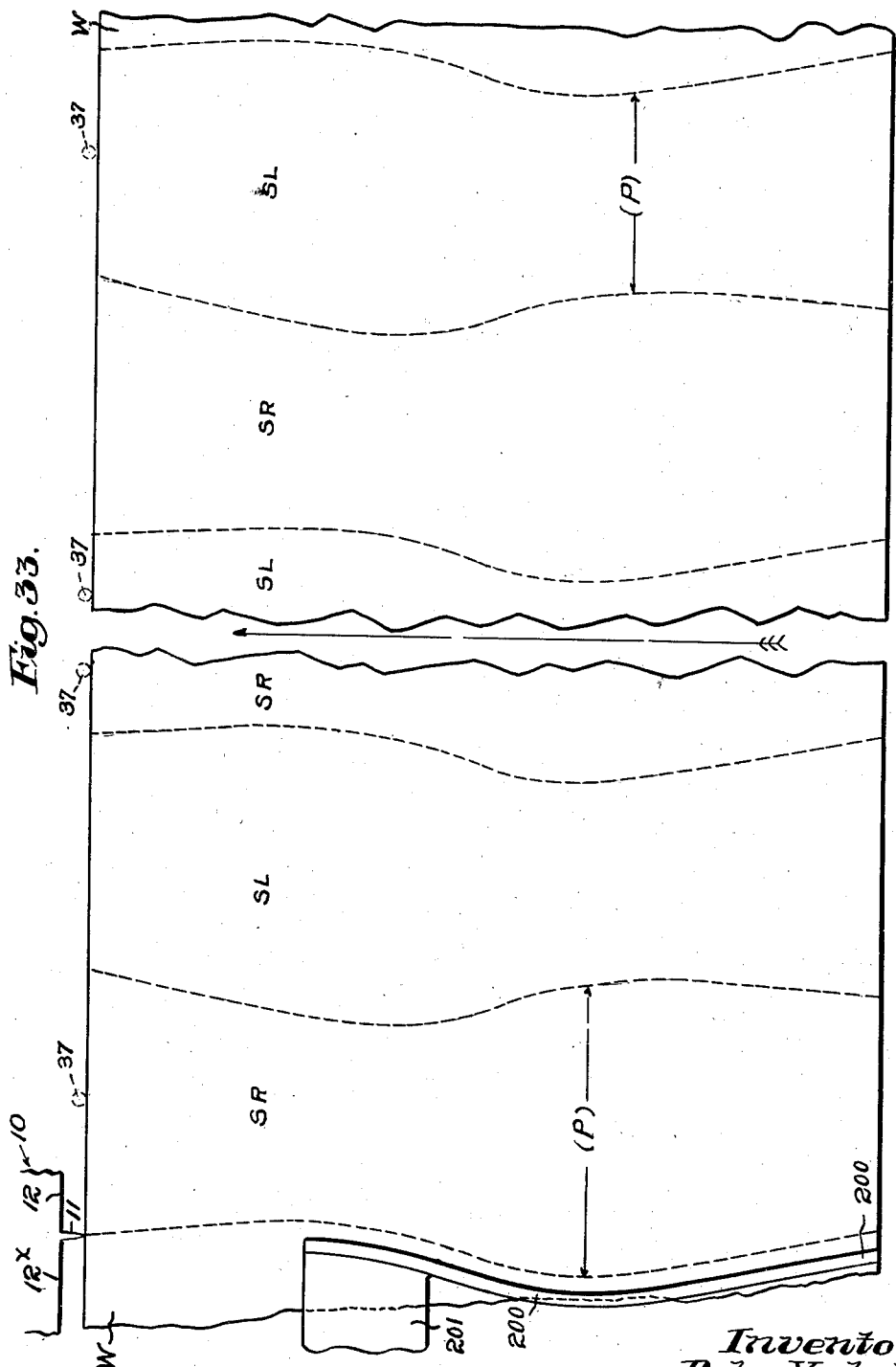

Figs. 5 to 10 inclusive are a progressive series of partly diagrammatic views illustrating one full operating cycle of the machine;

Fig. 11 is a partly diagrammatic front elevation of the drive side of the machine, for convenience in considering the diagram Figs. 5 to 10, the position of the parts in Fig. 11 corresponding to that of Fig. 5;

Fig. 12 is an elevation of the external parts of the upper or cutter roll assembly;

Fig. 13 is a longitudinal section substantially on the line 13—13 of Fig. 12;

Fig. 14 shows separately a holder bar, with but one collar element installed, further to illustrate the manner of assembly of certain cutter roll parts;

Fig. 15 is a cross-section on a larger scale on the line 15—15 of Fig. 12;

Fig. 15a is an elevation on the scale of Fig. 15 looking at the outside of the drum at one of the locking cam locations, for example as if viewed from the upper left in Fig. 15;

Fig. 16 is an end view, on the scale of Fig. 15 as if looking from the right at Fig. 14;

Figs. 16a and 16b are enlarged longitudinal and end elevations of a blade-clamp and associated work-positioning stop pin;

Fig. 17 is a partial front elevation corresponding to Fig. 16;

Fig. 18 is an elevation corresponding to Fig. 12 but on a smaller scale, including the cutter roll shaft and the skeleton cylinder or drum on which the blades and collars of Figs. 12 to 17 are adapted for demountable assembly;

Fig. 19 is a cross-section on a larger scale as on the line 19—19 of Fig. 18;

Figs. 20 and 21 are edge and face views respectively, on the scale of Fig. 19, of a removable locking key for the blade and collar assembly, as seen at the left in Fig. 18;

Fig. 22 is a diagrammatic cross-section explanatory of the design, structure, operating principles and relations of the cutter assembly;

Fig. 23 is a development of the partial cylindrical surface defined by the positioning collars or plates adjacent the base of the knives;

Fig. 24 is a pattern diagram on a larger scale illustrating the method of determining the contour and dimensions of the blade-locating collars for any desired sole size;

Fig. 25 is a development diagram of a typical collar illustrating a further step in its formation;

Fig. 26 is a cross-section of a blade and associated collars, for convenient reference in connection with Fig. 25;

Figs. 27 to 29 are detail views of one form of blade, Figs. 27 and 28 being elevations edgewise of the blade showing the same in two stages of formation, and Fig. 29 being a cross-section of the blade as installed;

Figs. 30 to 32, corresponding to Figs. 27 to 29, show another blade construction; and Fig. 33 is a plan diagram illustrating the sidewise direction of feed of the work strips and the manner of gauging the irregular ends thereof for the cutting operation.

Referring to the drawings and first to Figs. 1 to 4, the machine comprises a base or bench-like support including laterally spaced uprights 1 and 2 connected by a cross member 3. The base further includes at one side, here the right, Fig. 1, a lateral extension 4 joining it with a platform 5 for the power drive. While the machine may be otherwise driven, from any available power source, I have herein shown for the purpose a built-in power plant including an electric motor 6 and a speed-reducing transmission unit 7 to the input side of which the motor shaft is coupled as at 6a, Fig. 3. On the base are erected side frames 8 and 9 on and between which the various operating parts are supported. One frame, herein that at the left, Fig. 4, is formed at its upper portion with a forwardly open arch or cantilever member 8a, permitting the handling of extra long work strips, and also making provision for cutting one end portion or any less than total section of the strip when so desired, the uncut portion projecting laterally out through the arch. The other frame 9, herein at the right, Fig. 3, may be of upright generally rectangular form as shown, the driving and control mechanism being located mainly at this side.

Figure 1:
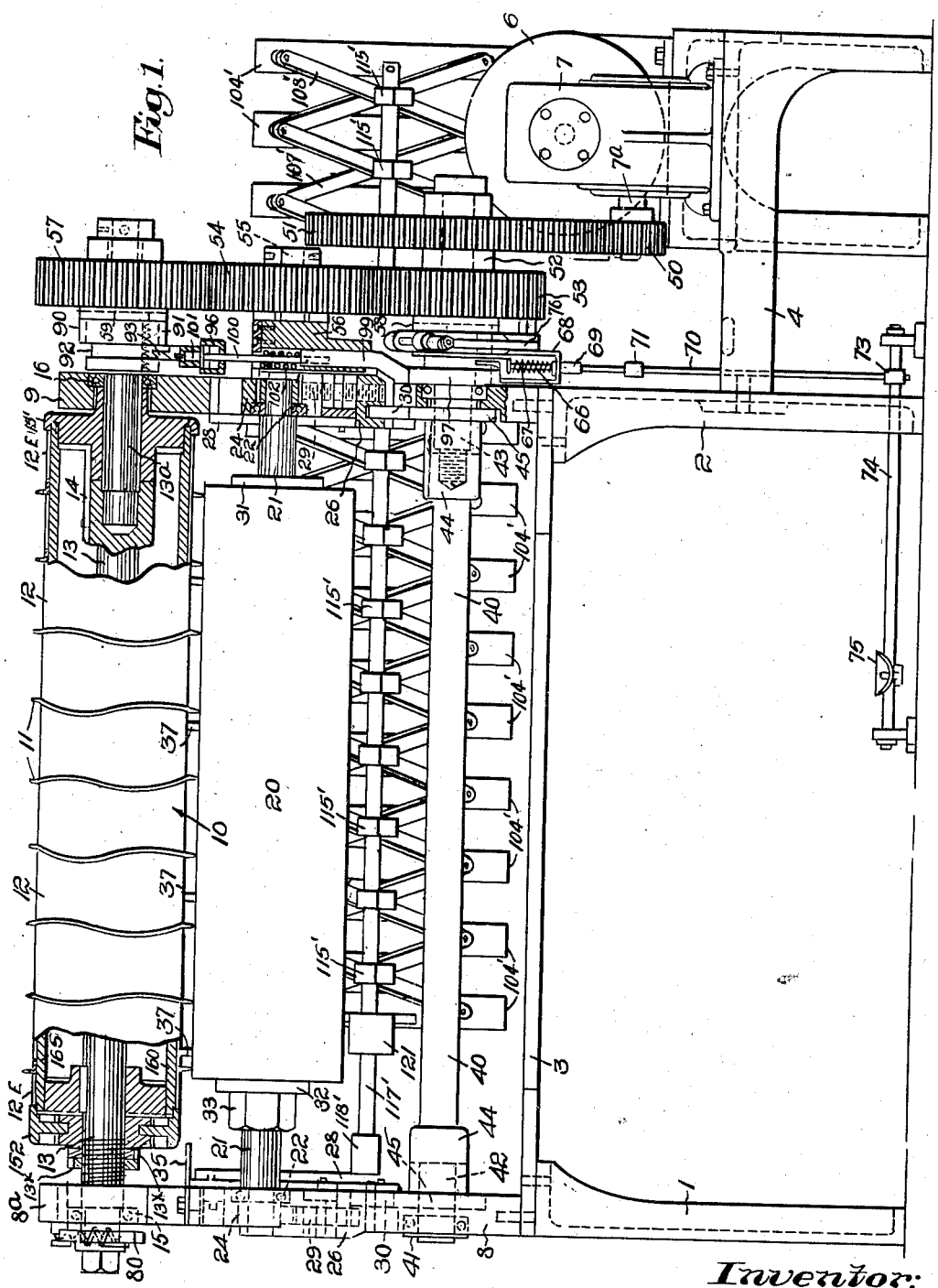
Fig. 1 is a front elevation of the machine as a whole, with parts broken away or sectioned.
Figure 2:
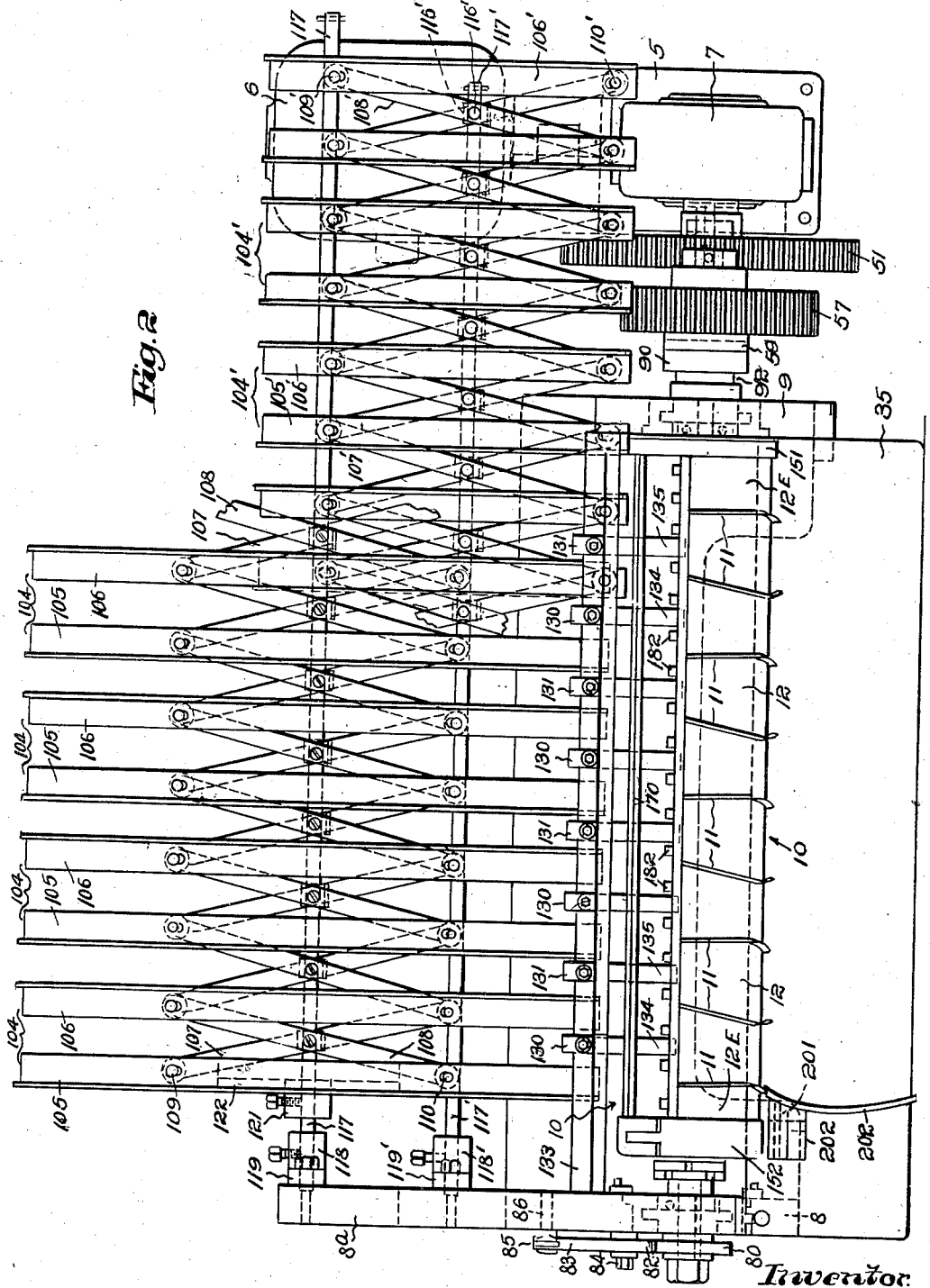
Fig. 2 is a top plan of the machine of Fig. 1.

For carrying out the novel cutting process of the invention, particularly as applied to cutting block soles and the like from leather and other strips, the machine incorporates opposed rotary means to and between which the work strips are presented and advanced sidewise, and by which the strips are accurately cut along curved lines in the general direction from front to rear of the machine and crosswise of the strips themselves. Such means herein comprises first a rotary cutter assembly designated generally at 10, to be referred to as the upper or cutter roll. It is equipped with a plurality of radially projecting and angularly extensive cutting members, knives or blades 11, of the special design, construction and manner of assembly to be described. By way of example a gang of nine such curvilinear blades 11 is represented in Figs. 1 and 2, equally distributed axially along the cutter roll so as to divide the work strip simultaneously along a like number of cut lines, each cut line (except at the ends of the series) being common to two soles, one sole at each side of each blade. Thus in the particular example eight complete soles, each with two curved cut sides, is formed in the one operation.

The cutter roll assembly 10 further comprises a plurality of arcuate positioning collars or plates 12, one between each two adjacent blades 11, and also at the outer sides of the end blades, as at 12E, Figs. 1, 2, 12, 13 and 23. As will be explained these collars are novelly shaped, proportioned and assembled with relation to the blades 11 and with respect to the size and shape of the particular soles or other articles to be cut, so as to provide the exact pattern and dimensions required. The circumferential outer faces of the collars 12 together define the cylindrical surface in which the curvilinear positioning of the radially projecting curved blades is accomplished. This cylindrical outer surface of the cutter roll has predetermined clearance relative to the adjacent upper face of the work strip, throughout the cutting cycle.

The opposed rotary means as above mentioned further comprises an elongated bed roll or drum indicated generally at 20, to be referred to as the lower or work-supporting roll. Since the machine as illustrated is organized for handling the work in a generally horizontal plane, as is found desirable, and the two main rotary elements or rolls 10 and 20 have their axes spaced vertically, the terms "upper" and "lower" are convenient for descriptive purposes, but will be understood as not limiting with respect to the plane of the roll axes, since the rolls may be disposed in parallel relation otherwise than with their axes vertically spaced, and the work path or plane of operation defined between the rolls may be other than horizontal.

The upper or cutter roll 10 and the lower or bed roll 20 have capacity for relative movement to and from feeding and cutting relation to the work strips. For this purpose either or both rolls may be bodily movable, but preferably one roll has a fixed axis while that of the other roll is movable toward and from the first. Either the cutter roll 10 or the bed roll 20 may be the bodily movable element, and either of them may be employed in either the upper or the lower position. In the preferred embodiment, as illustrated, the cutter roll is uppermost and is supported on a two-part shaft 13, 13a detachably connected as at 14, with its opposite ends journalled in bearings 15, 16 fixed on the respective side frames. Hence, to afford the desired separability, the bed roll 20, having its axis parallel to and spaced vertically below that of the cutter roll, is arranged for vertical shifting movement toward and from the latter. It has a supporting shaft 21 journalled in bearings 22, 22 in bearing blocks 24, 24 adjustable in vertically sliding bearers or riders 25, 25, at each side of the machine, see Figs. 3 and 4.

Adjustment of the bearing blocks 24 in and relative to the slidable riders 25 provides for relative radial or transverse adjustment as between the upper and lower rolls 10 and 20 to set them for operation on work strips of different thicknesses. These riders each include a horizontal bottom portion 26 and a centrally open U-like block-carrying portion 27, each rider unit being guided in vertical ways 28 on the respective side frames 8, 9. The opposed inner faces of the U-portions 27 of the riders have aligned vertical guideways 27a slidably receiving the corresponding shaft bearing block 24. Adjusting screws 29 having their upper ends tapped into the bearing blocks 24 and their lower ends threaded into the rider bottom portion 26 provide means for regulating the spacing between said parts. Hence, with the riders in given position, said means 29 in effect correspondingly adjusts the lower roll shaft 21 toward or from the upper roll 10. Rotatively mounted on the bottom portions 26 of the riders 25 are cam rolls or followers 30 coacting respectively with lifter cams 45 to be described, one at each side of the machine. In this manner the lower roll 20 is lifted and dropped in the course of each operating cycle, automatically, the lifting being accomplished by power.

The cylindrical body of the lower roll 20 may be formed of any suitable material for supporting the work strips as the blades cut downwardly through them and penetrate to some slight extent into the lower roll surface. For example a multiplicity of laminate fibre disc-like members having their fibres or grain radially disposed may be coaxially assembled and held in firmly compacted relation on the shaft 21, as between a fixed collar 31 near one end and a washer 32 at the other end adjustably held by a nut 33. The described construction is merely illustrative of the renewable or other surfacing means which provides for the lower roll a firm work-supporting surface adapted to sustain penetration by the knife edges to the extent desired. This may be merely sufficient to insure complete through-cutting of the strips.

In the illustrated embodiment of the invention and according to the principle thereof the machine is organized to have a complete operating cycle for each work strip. Each such cycle is initiated at the will of the operator and is terminated automatically. The several phases of each cycle herein comprise a roll-closing phase in which the sidewise-presented work strip (designated W on the drawings) receives an initial or entering cut at the plurality of points along its leading edge and is simultaneously locked with the rotary cutter means for automatic feed through and between the two rolls. This starting phase is immediately followed by one full 360° rotation of the roll pair during which the strips are completely cut and the cut soles SR and SL sorted and delivered. At the end of this main operational period all parts have automatically returned to and halted in their normal rest or starting position with the rolls separated or open, in readiness for the next cycle. One such complete operating cycle is illustrated by the progressive series of diagrams, Figs. 5 to 10, more fully referred to later.

To provide for interposing the strip between the rolls and for an initial non-rotative enter-cutting and strip locking action relative to the blades, the rolls 10 and 20 are afforded the capacity for separation or relative closing and opening movement previously mentioned. At the end of and between cycles, the rolls stand open or vertically separated, see Fig. 5 (the cylindrical surfaces of the rolls do not come into mutual contact at any time, nor does the surface of the upper roll engage the work). The lower roll 20 herein has at the between-cycle times a normal open or rest position somewhat below the operating plane or path of the work strips. The described shaft-supporting riders 25 and their cams 45 provide for power lifting of this lower roll 20 to active operating position, and for its subsequent return to lowered open rest position.

Referring again to Figs. 1 to 4, the front or work-presenting end of the machine is provided with a work table 35, facing the operator and at convenient working height. This table is adjustably and removably held as by bolts and set-screwed posts in vertical sockets on the machine frames, as at 36, 36, Figs. 3 and 4. For any given job it is set with its work-presenting surface at or just above the level of the top of the lower roll 20 in the down or rest position of the latter; see Fig. 5. The spacing of the rolls 10 and 20 in their open rest position is regulated to the thickness of the particular work strips W, as by the described adjusting screws 29, so that as each strip is forwardly presented across the work table, long side foremost, it may enter freely between the rolls, with its leading margin directly below the initial portions of the cutter roll blades 11. For accurately positioning and aligning the strip and uniformly determining the starting point along the work path and with respect to the cutter roll the latter has a series of spring-projected radial pins or positioning stops 37 in line axially of the roll. When the rolls are open, Fig. 5, these work-positioning pins 37 are thrust out beyond the edges of the blades 11, ready to be abutted by the leading edge of the sidewise-presenting strips W. It will be noted that in Figs. 1, 3 and 4 the lower roll 20 is shown lifted to active position; see Figs. 16a, 16b for details of the stop pins.

The entire operation of the machine is automatically effected and controlled, subject to initiation at the will of the operator, herein through drive gearing, cam means and associated non-repeat or one-revolution clutch devices operatively interposed between the power source and the driven parts. In this connection it is noted that the cutter roll 10 is positively driven. The work-supporting lower roll 20 may also be driven but that is unnecessary. In the illustrative example it is an idler, turning in unison with the upper roll 10 through the coaction of the blades and the work strips upon it. Hence the shaft 21 of the lower roll need not extend beyond the side frames, thereby making for compactness, as is particularly desirable at the driving or power side of the machine, at the right in the example shown.

The timing and control mechanism is herein associated with a cam shaft 40, below and paralleling the axes of the roll pair, with suitable bearings in the respective side frames as at 41, 41. For convenience in assembly the cam shaft may be formed in separable sections including a journal 42 at the left end and an extension 43 at the right end, projecting beyond the adjacent side frame 9, the shaft sections being detachably coupled as at 44, 44. On the cam shaft 40 are fixed the previously-mentioned lifter cams 45 for the lower roll 20, one such cam at each side of the machine in vertical line below the corresponding followers 30 of the rider assemblies 25. These lift cams 45 best seen in Figs. 3 and 5 to 10, have a depression as at 45a for the rest position and a raised or lift portion continuing around the remainder of their peripheries. As the cam shaft begins rotating at the start of an operating cycle the followers 30 leave the cam depressions and accordingly the riders 25 and with them the lower roll 20 are thrust up from the rest position of Fig. 5 to the active feeding and cutting position of Figs. 6 to 8, also Figs. 1, 3 and 4. This continues until the final phases represented in Figs. 9 and 10. During these latter the lower roll 20 returns to and remains in its separate inactive position, while the cutter roll 10 completes its cycle.

Figure 3:
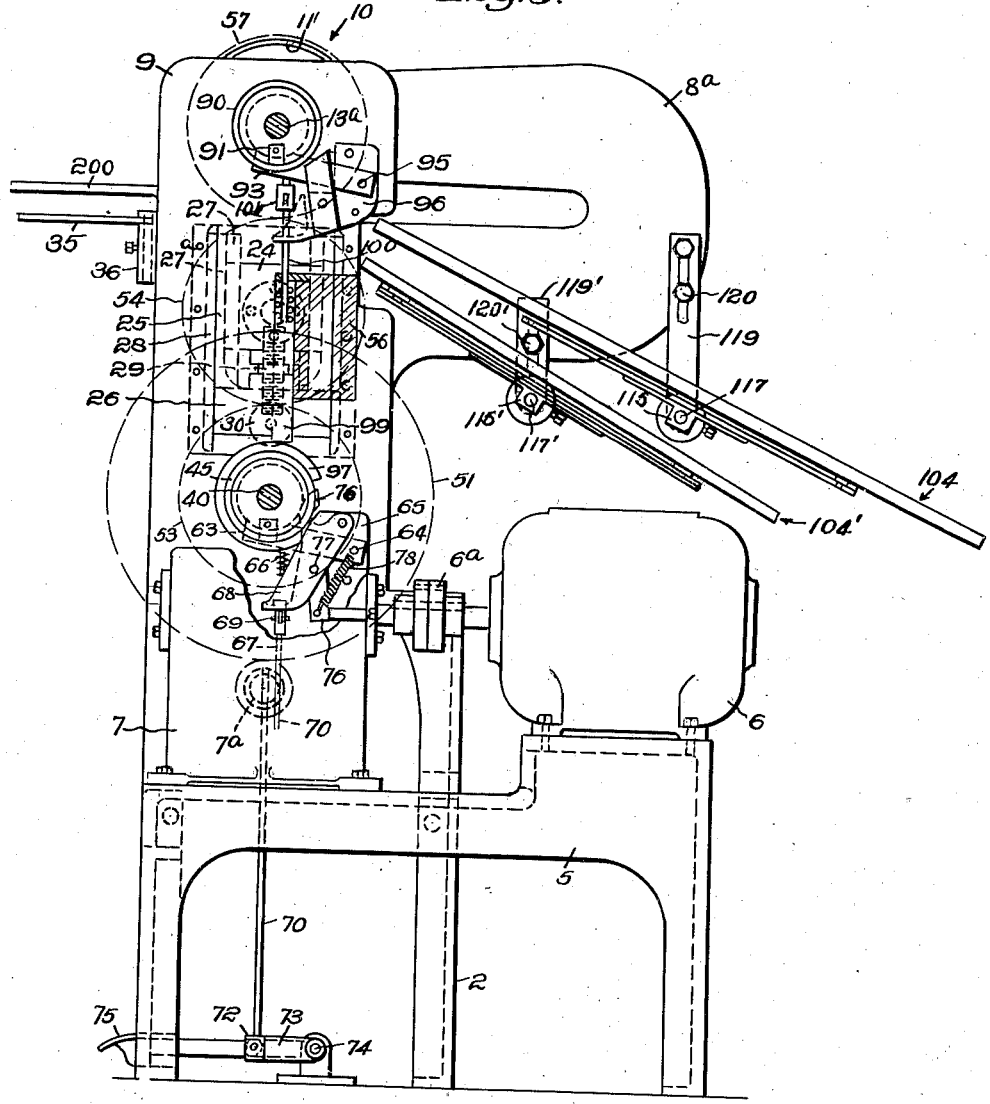

Referring now to the power drive and gearing connections, see Figs. 1, 3 and 4, also Fig. 11, the output or low-speed shaft 7a of the reductor 7 has keyed on it a pinion 50 meshing with a large gear 51 having a bearing sleeve 52 loosely disposed on the extension 43 of the cam shaft 40. Fixed concentrically on or integral with the sleeve 52 is a lower gear 53 meshing with an intermediate gear 54 rotatable on a stub shaft 55 on a bracket 56 set out from the side frame 9, opposite and spaced from the adjacent end of the lower-roll shaft 21. The intermediate gear 54 in turn has driving engagement with a top gear 57 freely mounted for rotation on the projecting end 13a of the upper-roll shaft.

The described gear train is arranged to be driven continuously so long as the motor is running, that is, throughout any particular working period. In the intervals between operating cycles, the rolls 10 and 20 and the cam shaft 40 remain at rest. To accomplish this, clutch devices as referred to are interposed between the gear train and the parts to be driven, one for the cam shaft and another for the cutter roll. The first or cam-shaft clutch is arranged to be thrown in, to start the operating cycle, manually as by pedal control by the operator and is subsequently automatically released. The cutter-roll clutch is herein automatically engaged after an initial phase of the cycle and is automatically disengaged to terminate the cycle, with all parts in original starting position.

The two clutch units may be generally similar and of any known or preferred type adapted for non-repeat or one-cycle operation. The constantly rotating or driven members for the respective clutches are herein shown as a hub plate 58 fixed with the lower gear 53 and a similar hub plate 59 rotating with the upper gear 57.

Considering first the cam-shaft drive, said hub plate 58 at the lower gear 53 has associated with it a clutch collar 60 fast on the projecting end 43 of the cam shaft and carrying a spring-pressed plunger-like key 61. This key is movable between engaged or clutched position, shown in Fig. 11, wherein its outer end is received in a radial groove of the hub plate 58, and an opposite retracted disengaged or unclutched position. In this latter the cam shaft is free to remain at rest, while in the engaged position of Fig. 11 it is driven from the continuously rotating gear 53. The clutch key 61 has a cam groove 62 extending in the direction circumferentially of the shaft. A clutch lever 63 having a bevelled cam surface for retracting the key is located in the path of said key groove 62, said lever being pivoted as at 64 on a bracket 65 attached to the adjacent side frame 9; see Fig. 3.

As best seen in Figs. 1 and 3 the clutch lever 63 is urged upwardly into the raised position of Fig. 3, and as indicated by the full line showing in Figs. 5 to 9, so as to enter the groove 62 of the clutch key 61 when the latter comes opposite it. This is accomplished by a compression spring 66 surrounding a push rod 67 pivoted at its upper end to the lever 63 and projecting downwardly through a yoke 68 formed with or carried by the above-mentioned bracket 65. The spring 66 bears at its upper end against the lever 63 and at its lower end against a slide washer on the push rod 67 abutting the bottom wall of the yoke 68. Below the bracket 65 the push rod 67 is connected as at 69 to the upper end of a treadle rod 70. The latter, desirably adjustably jointed as at 71, is pivotally linked at its lower end as at 72, Fig. 3, to an arm 73 fast on a treadle shaft 74 having a tread or pedal 75 at a convenient position for the operator, who will generally stand about centrally at the front of the machine. Any other preferred manual control for the clutch lever 63 may be provided.

It will be understood that on depression of the treadle 75 the lever 63 for the cam-shaft clutch is pulled down, to the dotted line position shown in Fig. 5, freeing the clutch key 61 to engage the clutch, as represented in Fig. 11. The cam shaft thereupon begins to rotate, initiating the operating cycle. Desirably a constant-friction means is provided to insure against creeping of the cam shaft during inactive periods between cycles, or overrunning on release of its clutch. For this purpose, as best seen in Fig. 3, also Fig. 1, I have provided a brake finger 76 having its upper end yieldably frictionally engaging a grooved portion of the clutch collar 60 and intermediately pivoted as at 77 on the bracket yoke 68. A tensioning spring 78 having one end anchored on the bracket and its other end attached to the outer end of the brake finger engages the latter with the clutch collar.

From the foregoing it will be apparent that the manual control associated with the clutch lever 63 provides for initiation of the operating cycle at the will of the operator. The clutch lever having been pulled down to its dotted position of Fig. 5, thus enabling the cam shaft 49 to start the operating cycle, the treadle or other control may be released, whereon the clutch lever 63 is automatically returned to its raised full line position of Fig. 5 by its spring 66. It will be understood that with the rotation of the cam shaft the clutch key 61 rotates away from the initial Fig. 5 position at the lever 63, the latter being received and riding in a grooved portion of the clutch collar. On completion of one full 360° revolution of the cam shaft (the cutter roll 10 then continuing somewhat further as will be explained) the key 61 again comes opposite the lever 63 and is withdrawn, inwardly, toward the left in Figs. 1 and 11, by the camming action of the bevelled portion of the lever.

With the initial rotation of the cam shaft, herein through an angle of 90°, from the position of Fig. 5 to that of Fig. 6, the lifter cams 45 move up under the follower rolls 30 and thereby thrust the lower roll 20 to its active position as in Figs. 6, 7 and 8 of the diagram series, also as assumed in Figs. 1, 3 and 4. Thus the lifting of the roll 20 and the starting of the cut lines is effected by power, under the control of operator through the medium of the described one-revolution manually engaged and automatically released clutch means.

As the rolls 10 and 20 are thus brought together in the first phase of the cycle it will be seen, particularly by reference to Fig. 6, that the opposed portions of the cutter-roll blades 11 are forced completely through the leading edge portion of the work strip W positioned and aligned by the stop pins 37. This entrance cutting or cut-starting action accurately locates and defines the entire plurality of cut lines. The spacing of the roll axes is calculated and adjusted, with relation to the average thickness of any particular run of work strips, so that under the described power pressing action the blades 11 are caused to cut non-rotatably completely through the thickness of the strip, their cutting edges desirably penetrating into the body of the bed roll 20 enough to insure complete through cutting.

This same initial non-rotative relative bodily approach movement of the rolls has a further important function. By reference to Fig. 33 for example it will be noted that the entering portions of alternate cut lines are oppositely inclined to the radial plane of the cutter roll. Consequently each of the similarly inclined blades 11 is in effect immediately locked into the work strip W. Thus a positive feeding relation is established between the cutter roll knives 11 and the work and also between the work and the lower roll 20, by reason of the down-thrusting cutting action of the knives or blades, pressing the work against said lower roll. Thus the immediately following rotation of the cutter roll will cause the particular strip W to be advanced at a uniform rate, the lower roll in effect being driven from and by the knives and the work strip. The same locked feeding and down-pressing relation of the blades with respect to the work is maintained throughout the entire following rotary cutting action.

Further in this connection it is particularly noted as an important feature of the invention that neither at this first phase of non-rotative cut-starting and blade interlocking nor at any time during the subsequent rotary cutting is there any appreciable direct pressing contact between the top face of the work and the cylindrical surface of the cutter roll defined by the series of arcuate collars 12. To the contrary the parts concerned are constructed and arranged to insure clearance at the location mentioned, under any usual working condition. This feature is of special significance in the sole cutting art, particularly with leather, as to which latter any appreciable compressing action and ironing effects are not acceptable. The clearance is made sufficient, as by the described axial adjustment of the lower roll, to take care of any thickness variation likely to be met in a given run of leather strips, without compressive top-face contact. Such variation frequently averages from $\tfrac{1}{16}$ to $\tfrac{3}{16}$ in. This clearance feature and related points will be further apparent from the later consideration of the construction method and operation diagrams in Figs. 22 to 26; see also the separate views of the blades, Figs. 27 to 32.

The cut-starting and blade-locking action at the first of the cycle may have some tendency to advance the cutter roll, by reason of the arcuate configuration of the penetrating portions of the blades 11, noting particularly Fig. 6. To prevent any such angular displacement of the roll cutter, including misaligning or overrun at the end of a cycle, means for locking and aligning the cutter roll in its zero or starting position is herein provided.

Noting Fig. 4, also Fig. 1 at the upper left, such means herein comprises a locking member or cam 80 fixed on the cutter roll shaft 13, at the left in this instance. This locking member has a peripheral notch as at 81 to receive the nose 82 of a spring-pressed dog 83 pivoted as at 84 on the upper portion 8a of the left side frame 8. A spring 85 is connected between the end of the dog remote from the locking cam and a fixed point on the frame 8a as at 86, see also Fig. 2, urging the dog toward the locking cam. The notch 81 of the latter is shaped to release the dog as the power cycle is started, and again to lock the cutter roll on completion of one revolution.

Referring still to Figs. 1 to 4, also Fig. 11, the drive and control mechanism herein further comprises means whereby the described initial rotation of the cam shaft, for bringing the rolls together and making the entering cuts, also starts the progressive rotary cutting action. This is herein accomplished through control means now to be described, associated with the cam shaft, and whereby the non-repeat or one-revolution clutch device for the cutter roll is in turn actuated for drivingly connecting the cutting roll with the power source through the described gear train.

Considering now the cutter roll drive, the upper gear 57 as previously noted has a hub plate 59, generally similar to that for the cam shaft clutch, but having its radial slots appropriately offset angularly with respect to the latter. For cooperation with this hub plate the cutter-roll shaft 21 carries a clutch collar 90 having a spring pressed sliding key 91 and an annular groove 92 for a controlling clutch lever 93. These parts may be generally similar as for the cam-shaft clutch, the key 91 having a notch 94 engageable with the clutch lever 93, whereby the clutch is engaged or disengaged. This lever for the cutter roll clutch is pivoted as at 95, Fig. 3, on a yoke-shaped bracket 96 on the adjacent side frame 9.

Automatic means is herein provided for controlling the cutter-roll clutch, to start and stop the rotation of the cutter roll in timed relation with the closing together and subsequent opening of the two rolls. For this purpose the cam shaft 40 has fixed on it, herein just outside the right frame 9, a trip cam 97, Figs. 3, 5 to 10 and 11. This cam has an initial depression or dwell portion 98 followed in the counter-clockwise direction in Figs. 5 to 10 by a raised portion continuing around the remainder of the cam. Cooperating with it is a rider assembly including a follower block 99 at the lower end of a trip rod 100 extending up through the bracket 96 and pivotally linked to the upper clutch lever 93 as by the adjustable coupling 101.

As best seen in Fig. 1 and diagrammatically in Fig. 11, the follower or rider proper 99, which may be a fairly heavy part, is guided for vertical movement in the adjacent portion of the bracket 56 which carries the stub shaft for the intermediate gear 54. This follower 99 together with the trip rod 100 and the clutch lever 93 is urged downwardly, for tripping said lever when the cam depression 98 comes opposite the follower. This is herein effected by a coil spring 102 surrounding the trip rod and bearing between the follower 99 and an overlying stop and guide plate 103 detachably secured to the bracket 56.

From the foregoing description in conjunction with the drawings the intermittent operating cycles of the machine will readily be understood, particularly from a comparison of the progressive series of diagrammatic views, Figs. 5 to 10. Each cycle is started at the will of the operator and is automatically terminated. So long as the motor 6 is running, that is, during any given work period or cutting job, the gears of the train 52—57 continue to rotate. Otherwise the machine rests between operating cycles.

We will now consider the progressive operating diagram series Figs. 5 to 10, and noting particularly Fig. 11 as related to them.

Fig. 5 represents the rest or starting position of the parts, which again arrives in Fig. 10. In Fig. 5 the cam-shaft clutch lever 63 is shown in dotted line in the position to which it is pulled down by depression of the starter pedal 75. The corresponding cam-shaft clutch key 62 is thereby released to engage the cam-shaft clutch collar and hub-plate elements. The cam shaft 40 accordingly starts to rotate, counter-clockwise in the diagrams (also as viewed in Fig. 3).

Fig. 6 represents the condition of the parts after a 90° rotation of the cam shaft 40. Release of the starting treadle 75 has permitted the lower lever 63 to return to its up position, under the action of the spring 66. To this point the cutter roll 10 and the bed roll 20 have remained at rest. The latter, however, under the power action of the lifter cams 45 has been thrust up into pressing engagement with the underface of the work strip W, forcing the leading longitudinal side edge portion of the latter upward through the adjacent leading ends of the arcuate blades 11, and effecting the locked feeding condition for the work strip. It is to be noted that the cylindrical surface of the cutter roll, as defined by the blade positioning collars 12, has distinct clearance above the upper face of the work strip W, as previously stated.

At the completion of this first operating phase, as at Fig. 6, the trip cam 97 on the cam shaft 40 has also rotated 90° with the latter, bringing the trip-cam depression 98 opposite the follower 99 associated with the upper or cutter-roll clutch lever 93. The latter accordingly trips down to the Fig. 6 position, by gravity aided by the spring 102. The corresponding upper clutch key 91 consequently is released and the clutch-collar and hub-plate elements for the cutter-roll shaft are engaged. Hence at this point the cutter roll starts to rotate, commencing the progressive rotary cutting and feeding action.

Fig. 7 shows a further phase of the operating cycle, the cam shaft having rotated 180°, while the cutter roll 10 has turned through but 90°. The work strip W indicated in broken line has advanced approximately half-way through the rolls, so that the sinuous cut lines formed by the blades have at this time progressed about half-way rearwardly across the width of the work strip. The leading ends of the cut soles SR and SL (indicative of rights and lefts) are projected beyond the rolls and have begun to be sorted into different planes for delivery. Meanwhile the continuing rotation of the trip cam 97 has brought its raised portion under the follower 99 and re-elevated the upper clutch lever 93 into position for disengaging the cutter-roll clutch at the end of the cycle.

Fig. 8 represents a further phase of the cycle, the cam shaft 40 now having turned 270° and the later-starting cutter roll having rotated through 180°. As indicated by the position of the soles SR and SL the rotary cutting action has now been substantially completed. Otherwise the parts have continued their relative positions as in Fig. 7.

Fig. 9 diagrams the same parts after another and final 90° rotation of the cam shaft 40. The latter has now rotated through a full 360°. The cam-shaft clutch key 61 has again come opposite its lever 63, and the corresponding clutch is disengaged, stopping rotation of the cam shaft. At this stage the actual cutting operation has been completed, and the soles SR, SL have been freely discharged into their distributing chutes, to be described. At the same time the depressions 45a of the lower-roll lifter cams 45 have come opposite their followers 30 so that the lower roll 20 drops to its separated inactive or rest position.

The cutter roll 10 however continues to rotate through a further 90° of its cycle, until in the Fig. 10 position the original condition of the parts as in Fig. 5 is reached. The upper clutch key 91 then has come opposite the cutter-roll clutch lever 93, thereby releasing the corresponding clutch and stopping rotation of the cutter roll 10. All operating parts have now returned to their original stationary position and are in readiness to perform another cycle.

It will be understood that the stopping of the cam shaft 40 as at Fig. 9 does not discontinue the drive of the cutter roll 10, since the drive for the latter is effected through the described gear train, independently of the cam shaft. The cutter roll continues to be driven to its initial position as in Fig. 10 (Fig. 5). Hence while both the cam shaft 40 and the cutter roll 10 make but one full 360° revolution, the cutter roll starts 90° after the cam shaft, and correspondingly continues 90° after the cam shaft stops.

The cutter roll 10 is positively stopped and locked in its starting and terminal positions by the described locking dog 83 and associated notched disc 80 on the cutter-roll shaft, Fig. 4 and upper left in Fig. 1. Similarly the cam shaft 40 is accurately positioned and held between cycles, by the action of the parts themselves and as insured by the constant-friction or brake means 76, Fig. 3, as previously described.

As previously noted, the work strips W are presented sidewise to the machine, long side foremost. This relation of the strips to the machine, and the position of the article patterns or soles in a given strip are represented in Fig. 33. The right and left soles SR and SL alternate in side by side relation from end to end of the work strip W, with alternate soles reversed lengthwise, heel to toe. Thus heel and toe portions alternate along each of the long sides of the strip, transversely of the machine.

Dpending on the type and size of sole the number of soles per strip may vary, from about 6 to 8 of the longer and wider sizes for men to 12 to 15 in the smaller sizes for women. As will be apparent from the later consideration of Figs. 12 to 22 the machine is organized for interchangeable blade arrangement, for cutting any desired size of sole. Hence on different jobs the number of soles to be cut simultaneously may be anywhere from 6 to 15 or thereabouts.

In any instance the cut sole products are delivered from the machine and collected in lots as desired. Preferably the soles from each cutting position along the rolls are respectively sorted and directed to a convenient receiver, rack or the like in which they may be stacked. Accordingly the delivering means as herein provided has a capacity up to the maximum number of soles likely per work strip, and is readily adjustable, in conformity with the particular number of blades employed for a given job, to accommodate the number of soles resultant per strip.

Referring to Figs. 1 to 4, such delivery means comprises a plurality of individual chutes arranged in two sets at different levels and herein of somewhat different lengths, for the sole rights and lefts respectively. The two chute sets, being substantially the same, are given similar reference numerals, with the addition of a prime mark for one of them.

Each chute assembly is constructed and arranged for universal adjustment for any size and number of soles within the capacity of the particular machine. Each individual chute designated generally at 104, 104' for the two sets, one for each interblade position at the cutter roll, comprises a pair of opposed parallel L-angle strips 105, 106 the horizontal walls of which together define the chute floor while the vertical walls provide side guides. The adjustable supporting means for these article sorting and delivery guide chutes provides for variably positioning the strip pairs of each chute in like spaced relation, and with each active chute equally spaced along the cutter roll, one at each interblade position. Such supporting means is shown as in the nature of a lazy-tongs or pantograph-like linkage system, one for each set of chutes, comprising centrally crossed and interpivoted X-like links 107, 108 (and 107', 108') adjacent links having their corresponding ends pivotally connected as at 109, 110, 109', 110'. The angle-strips for each chute 104, 104' are attached at said end pivot points 109, 110 in any convenient manner such as to afford unobstructed article-guiding surfaces within the chutes and allowing for appropriate pivotal and slight fore-and-aft movement between the parts in extending or contracting the chute assemblies in adjusting them to different jobs. Herein the link end connections 109, 110 (and 109', 110' of the other set) accordingly include countersunk flanged pivot bolt, washer and slot means as represented in Figs. 1 to 4.

The pairs of crossed chute-supporting links at each chute and between adjacent chutes of each set are themselves bodily supported on a fixed part, by means of slide collars 115, Figs. 2 to 4, into which are threaded the central connecting pivot pins 116 (Fig. 3) for the respective link pairs. These collars 115, 115' for the two chute sets are slidable on supporting bars 117, 117' extending from a stationary part, herein the frame arch 8a at the left of the machine, at which they are demountably held in bosses 118, 118' on depending bracket arms 119, 119' adjustably secured to the frame as at 120, 120'. For setting the chute assemblies in any desired extended or contracted position each support bar 117, 117' has at either or both ends of its chute series adjustable stop means shown as a set-screwed sleeve 121 carrying a stop arm 122 for abutting engagement with an under portion of the adjacent end chute-strip.

Both the upper and the lower universally adjustable chute assemblies extend along and project sufficiently beyond the cutter roll 10, herein at the right, to accommodate the maximum number of soles of the smallest size to be cut on the given machine. For clearness in Fig. 2 some of the chutes of the upper set are broken away at the right to expose the lower set, while the latter are correspondingly broken away at the left, along a major part of the cutter roll. In the illustrated example the machine is set up to cut eight soles. Hence only four chutes 104 and 104' of each set are in use for this particular job. The four active chutes 104 of the upper set appear in Fig. 2, aligned to receive alternate soles, starting at the left of the series, in this case rights SR, to be cut toe foremost. One active chute 104' of the lower set, for the sole lefts SL, is seen in Fig. 2 at the right end of the cutter roll. The other active chutes of the lower set appear below the roll in Fig. 1, the temporarily inactive lower chutes being seen projecting at the right in both Figs. 1 and 2. In this particular example the upper assembly comprises a total of eight individual chutes and the lower set seven.

For cooperation with the chutes and the cutter and feed rolls I desirably provide article directing guides or depressors, for insuring delivery of the soles to the proper chutes. Such means herein comprises a guide element, finger or depressor for each article position, arranged in two alternating series 130, 131 along the cutter roll, eight such depressors appearing in Fig. 2, behind and below the cutter roll 10. Alternate depressors 130 beginning at the left are for the upper chutes, for the sole rights in this instance, the other depressors 131 being aligned with the lower chutes, herein receiving the sole lefts.

The entire series of depressors 130, 131 is herein commonly supported, with capacity for individual adjustment and demounting, as by a cross bar 133 of L-section, Figs. 2 and 4, fixed at its opposite ends to the upper left frame portion 8a and the righth side frame 9 respectively. Each depressor has an arcuate nose portion 134 or 135 extending in the direction from the rear or delivery end of the machine into the space between the upper and lower rolls 10, 20. The depressors 130 for the upper chute series have an under guiding face substantially as at 136, Fig. 4, appropriate for directing the corresponding soles to the upper chute level. The other alternated depressors 131 for the lower chutes extend somewhat further to the rear and have a lower guide surface disposed along a lower level as appropriate to direct the corresponding alternate soles, herein the lefts, to the lower chutes 104'. Each depressor has an attaching portion including a horizontal forwardly open slot recess as at 137 adapted for adjustable seating on the rearwardly extending horizontal flange of the cross bar 133 to which it is releasably fixed as by the corresponding regulating set-screw 138, Fig. 4.

To this point the several main assemblies or subcombinational elements of the machine have been described and their cooperative relations and manner of operating pointed out, with detailed description of the assembly structures excepting that of the cutter roll or drum 10. I turn now to a more detailed consideration of the construction and manner of assembly of said cutter roll, the manner of mounting the knives or blades 11 and their positioning collars 12 with respect to the roll, and the methods involved in determining the dimensions, contour and relative proportioning and arrangement of said positioning collars and blades.

Referring now to Figs. 18 to 21, these views illustrate the cutter-roll shaft 13—13a and the associated skeleton supporting drum or elongated cylindrical frame which presents the series of part-circular radial blades 11. In accordance with the invention the blades are disposed subject to ready demounting as an assembly unit, for rearranging the blades of a given unit, replacing individual blades, or for interchanging the entire unit with another similar unit including a set of blades already assembled therein. In these views, as compared with Figs. 12 to 17, the blade assembly unit has been removed, more clearly to show the cylindrical frame or supporting parts of the drum.

In Fig. 18 the two main sections 13, 13a of the cutter-roll shaft are seen, including their detachable threaded connection at 14 and the clutch element 90 fixed at the right end portion of the shaft.

The cylindrical drum element as a whole includes end supporting and shaft-connecting means, herein comprising left and right end hubs 140 and 141. Each hub has a central sleeve or body portion 142 and 143 received on and keyed to the shaft as at 144, 145, together with an annular plate or disc portion 146, 147 defining end walls for directly supporting the longitudinal stringer members or sections 160, 165 and 170 of the drum; see also Fig. 1.

The supporting hub element 141—147 at the right has a concentric inturned flange or cup formation 149 defining with the disc portion 147 an annular inwardly open seat for the adjacent ends of the longitudinal drum sections. The associated drive key 145 is of a length to extend commonly into a keyway for it on the threaded connector portion 14 of the shaft section 13, whereby both parts 13, 13a of the shaft and the drum frame are here positively interlocked for rotation as a unit.

At the left, Fig. 18, the drum hub 140 has at the outer face of its disc portion 146 a key-seating squared formation or boss 148 having opposed transverse slots 150 together providing a keyway for a combined end flange and key member indicated generally at 152 and shown separately in Figs. 20 and 21.

This end key 152 is of the approximately three-quarter circular form as seen in Fig. 21, laterally open at one sector and having at its inner face, in its installed position, an inturned annular flange or cupped lip 154 opposite and cooperating with the cupped flange 151 at the other (right) end of the drum. The end key 152 further comprises a generally rectangular U-shaped tongue or key proper 156 for sliding reception in the keyway 150. Squared shoulder portions 158, 158a of the key, paralleling the U-rib 156 seat on corresponding squared portions of the hub boss 148, at either side of the keyway 150 thereof. This key 152 is drilled in the axial direction as at 156a, herein through its U-like key portion 156, and the hub boss 148 is correspondingly drilled and tapped to receive a countersunk locking screw 148a positively to retain the key in its assembled locking position of Fig. 18.

The longitudinal blade-mounting portion of the cutter drum 10 comprises the plurality of sections 160, 165 and 170 previously mentioned, between the drum ends or hubs 140 and 141. The main stationary section 160 is removably secured to the hubs as by the countersunk screw bolts 160a and 160b respectively. It is of arcuate and herein less than half-cylindrical form in cross-section, Figs. 18 and 19, the outer face defining a cylindrical support for the blades 11 and their positioning and anchoring collars 12. Fixed along the inner face of one longitudinal edge of this stationary section 160 (at the bottom in Fig. 19) is a bar 161 longitudinally recessed along one corner portion to define a receiving slot 162 for a corresponding portion of the longitudinally extending holding means of the blade and collar assembly to be described.

Cooperating with the stationary drum section 160 is a complemental circumferentially movable section 165. The angular extent of the latter is such that in the collar-locking position of Fig. 19, this movable section 165 together with the stationary section 160 present a substantially half-cylindrical supporting surface, with a spacing between the two sections, as indicated at 166, Fig. 19, equal to or slightly greater than the angular extent of the holding slot 162 (and of the opposite slot 168 of the movable section). The angularly-shorter movable section 165 bears at its opposite ends on the hub discs 146, 147 with capacity for sliding circumferentially through the spacing arc mentioned, between the blade-and-collar assembly locking position of Fig. 19 and a retracted releasing position toward or abutting the adjacent radial end face of the stationary section 160.

The circumferentially slidable drum section 165 has along the inner longitudinal edge remote from the stationary section a recessed bar 167 corresponding to the member 161 of the stationary section, defining a second holding slot 168 above mentioned, for the holding means at the corresponding longitudinal edge portion of the blade and collar assembly. The hollow and partly open cylindrical drum frame herein further comprises another and relatively narrow stationary section or filler plate 170, diametrically opposite an intermediate portion of the stationary section 160; see Fig. 19. This filler section 170, secured to the drum hub discs 146, 147 similarly as the stationary section 160, serves mainly as additional reinforcing connection between the drum ends.

The main stationary section 160 is formed with a plurality of radial apertures 163, Fig. 18, for seating and giving access to the blade-and-collar assembly locking cam means to be described with reference to Figs. 12–17, by which the sliding drum section 165 is forced into its locking position of Fig. 19 or released for backing away therefrom. In the illustrated example three such cam apertures 163 are provided, Fig. 18, for a corresponding number of cam devices, one near each end of the drum and one intermediately disposed about centrally.

Turning now to Figs. 12 to 17, these illustrate a blade and collar assembly, together with the stationary and slidable drum sections 160, 165 described in connection with Figs. 18 to 21, but for clearness omitting the drum end-supporting members and the shaft 13—13a.

Each such blade-and-collar assembly, comprising a series of the radial blades 11 and their positioning collars 12 together with the longitudinal holding bars and collar clamps to be described, is constructed and arranged for unitary installation and removal with respect to the drum. Thus when a change is to be made from one cutting job to another involving a different size and number of soles per work strip it is necessary merely to demount the given blade-and-collar unit and to replace it with another similar interchangeable assembly unit containing the appropriate number of blade and collars. Further, individual blades of a given assembly may be replaced without demounting the entire assembly.

The construction and arrangement of the individual blades 11 and the corresponding positioner collars 12 and their special configurations, dimensions and proportions relative to the sole pattern will be further described in connection with Figs. 22 and following. It is sufficient here to note that each blade comprises a radial portion or blade proper 11 and a seating flanged portion 11a at least at one side of each blade adapted to underlie the corresponding circumferential edge portion of the adjacent positioning collar 12. These collars each comprise an arcuate substantially semi-cylindrical main or working portion having the curved sinuous sides constructed in a manner to be more fully described, and having its opposite end portions inturned to provide substantially diametrically opposite clamping flanges 12a, 12b, Fig. 15. Where the blades are of L-form in cross-section, flanged at but one side, as in the main views (see also Figs. 26 to 29), each collar 12 desirably has secured at its inner concave face a relatively narrow spacer strip 12x, located somewhat nearer to one side edge of the collar than to the other (see Figs. 12 and 14), and having a thickness radially of the drum the same as that of the blade flange portions 11a. These spacers 12x seat directly on the stationary and movable drum sections 160, 165 and together with the blade flange portion 11a under the other side each of each collar positively locate the assembly units in the direction radially of the drum. Where the blades are of inverted T-form, as illustrated in Figs. 30 to 32, the collar spacer strips 12x may be omitted.

In Fig. 13 a set of blades 11, nine in this example, and the associated collars 12 are represented. In Fig. 12, eight blades have been removed for clearness, leaving a single blade installed at midlength position, for comparison with the cross-sectional view Fig. 15.

Each such series of blades and collars is assembled upon a pair of similar but reversely positioned holding bars 175, one for each of the flanged ends 12a and 12b of the collars. One holding bar 175 is shown separately in Fig. 14, with a single collar 12 in place on it, the other holding bar being there omitted, to show one of the collar clamping flanges more clearly. The two bars 175 appear in Fig. 15 in their reversed relation, at the opposite ends of a collar 12. Each such bar includes a radially outer portion having one longitudinal face recessed as at 176 to seat against one of the end flanges 12a of the collar series, preferably with some overlap onto the outer convex faces of the collars as at 177. Radially in from the collar-flange seat 176 the holding bar has a series of slots 178 distributed along the bar so that some portions of two adjacent slots will come opposite each collar position, in any of the various assemblies of different numbers and widths of collars.

The bade and collar holding means further comprises for each holding bar 175 a collar clamp element 180. Such element conveniently comprises a series of relatively short clamp sections disposed end to end along the collar series, preferably one such clamp 180 for each collar 12. Longer clamps may be used if desired. These clamping pieces 180 have threaded apertures as at 181, Fig. 16a, herein two for each section, respectively opposite a pair of slots 178 of the holding bar 175. Flanged screw bolts 182 extend through each holding-bar slot and into the corresponding threaded aperture 181 of the opposite clamping member 180, below the inner edge of the collar flange 12a.

The sinuous arcuate blades 11, two forms of which are separately shown in Figs. 27 to 32, are set in place on the holding bars, one between each two adjacent collars 12. After assembling the blades and collars upon the holding bars 175 and applying and tightening the clamps 180, these assembled parts may be manipulated as a unit, for installing on or removing from the drum 10. The collar clamps 180 have at their radial faces away from the corresponding holding bar 175 and toward the concave faces of the collars a longitudinal tongue or rib 185 shaped and proportioned for reception in the holding slot 162 or 168 of the corresponding edge portion of the stationary and the movable drum sections 160 and 165; see particularly Fig. 15.

To install a collar-and-blade assembly on the drum, assuming now that the flange-key 152 at the left of the drum has been removed, it is set transversely directly onto the drum sections 160, 165, open side foremost. It is shifted angularly to seat one aligned set of tongues 185 in the holding slot 162 of the stationary drum section 160. The assembly unit is then slidably forced toward the right, Figs. 12 and 18, bringing the outer straight circumferential edge of the end collar 12' and its underlying spacer 12x endwise up against the radial face of the right drum flange 149. The movable drum section 165 is then shifted circumferentially away from the stationary section 160, clockwise in Fig. 15. This engages the holding slot 168 of said movable section 165 over the other adjacent aligned collar-clamp tongues 185. The movable drum section 165 is adapted to be firmly abutted against said tongues and their collar clamps 180, the two drum sections being thrust apart, circumferentially, and locked in the holding position of Fig. 15.

Locking, and opposite release, of the sliding drum section is herein effected by the previously mentioned cam means, seen in Figs. 12, 13 and 15 and to be described. With the blade-and-collar assembly installed and locked circumferentially of the drum, the end flange-key 152 is slid transversely into and secured in its locking position as in Fig. 18. All the assembled drum parts may then be further tightened and aligned and accurate positioning insured for the knives through their collars, by turning up the threaded abutment collar and associated lock nut 13x and 13x', Fig. 1, against the left hub of the drum.

The locking cam means for the movable drum section 165 is best seen in Figs. 13 and 15, and in the detail plan view Fig. 15a. At each of the apertures 163 (Figs. 12 and 18) in the stationary drum section 160 the latter carries an eccentric disc cam 190, having its axis radial of the drum. Each cam has an outer bearing hub 192 rotatably received in the corresponding drum aperture 163 and an inner boss 193 rotatable in a bearing block 194 at the concave face of the stationary drum section 160 and secured to it as by screws 194a. Said supporting block 194 is recessed as at 195 to provide operating space for the cam eccentric. The outer bearing hub 192 of the cam has an axial non-round socket 196 opening outwardly to receive a cam operating wrench or tool. At the bottom of the socket 196 a countersunk screw bolt 197 extends axially through the cam and into a lock disc 198 at its inner end.

Referring to Figs. 12 and 15, also Fig. 2, it is noted that not only the locking cams 190 but also the collar-clamp screws 182 are readily accessible in the operating condition of the drum, with all parts installed. Said clamp screws 182, having squared heads or the like for engagement by a socketed or other appropriate tool, stand opposite the longitudinal open portions of the drum, at the respective lengthwise edges of the fixed filler-plate section 170. Thus the clamp screws 182 for any particular collars and blades may be reached at any time without demounting the entire blade-and-collar assembly. By backing out the appropriate screws 182, any one or more collars 12 may be freed sufficiently for the corresponding blades 11 to be slipped out from under them, the collars thus loosened being individually movable lengthwise of the drum by reason of the slots 178 of the holding bars 175. Thus replacement and interchanging of parts, either individually as to any blade, or for the entire blade-and-collar assembly is facilitated. In any given collar assembly the particular plates 12 at the locking-cam positions may have openings in line with the drum apertures 163, for entry of the cam-operating tool.

From the foregoing description it will be apparent that the cutter blades 11 are supported radially and also positioned laterally (lengthwise the drum) by the drum sections 160, 165 and by the collars 12, so that the entire radial portions of the blades outside the collars are unobstructed. The total radial extent of the blades beyond the outermost drum surface (the outer convex cylindrical surfaces of the collars 12) in accordance with the invention preferably is sufficient not only to penetrate completely through the thickness of the work-strips W but also to provide the working clearance between the upper face of the work (toward the drum) as previously mentioned. But it is the sinuous edge contour of the collars 12 which locates and restrains the radial cutting portions of the blades to the proper sinuous paths circumferentially of the drum, for cutting a sole or other pattern of given size and shape. Hence the lineal distances around the drum at the blade-positioning level or radius (the outer faces of the collars 12) are substantially different (less) from the corresponding lineal dimensions at the active work-engaging level or radius (the top face of the work).

Accordingly, referring particularly to Fig. 22, it will be seen that the shape and dimensions of the collars 12 (lying at the lesser radius from the drum axis) must be different from those of the sole pattern. This presents a problem inherent in utilizing circumferential lineally-cutting curved blades on a rotary cylindrical carrier or drum for rotary cutting of planar work strips of substantial thickness and density, such as sole leather and the like here concerned. Failure to appreciate and satisfactorily answer this problem is believed to be one of the chief reasons why cut soles have not heretofore been formed by rotary cutting, in actual successful practice.

The manner of solution of this problem, according to the present invention, will now be pointed out by reference to Figs. 22 to 33. Fig. 22 represents diagrammatically the relative positions of a work strip W and the cutter-drum assembly 10 just prior to the start of the rotary cutting phase of an operating cycle. As in Fig. 6 of the operating diagram series, the blades 11 have made their non-rotary entering cut through the leading edge of the work strip by the power elevation of the lower roll 20. Rotation of the drum 10 has not yet started, as indicated by the work-aligning stop pin 37 against the front (longitudinal) edge of the work strip W.

The radius from the drum center (axis) to the leading edge of the work strip, marked "Start," defines the starting or zero point for the lineal measurements around the drum as now to be referred to. The radius to the upper surface of the work strip W at the zero or start point is designated "Radius R." The radius at the outer surface C of the blade-locating collars 12, which surface C is shown by the heavy line in Fig. 22, is designated "Radius R¹."

The length of the particular sole pattern to be cut is equal to the width of the work strip W, from its leading side edge at "start" back to the rear edge of the strip. This length to be cut is designated as LP (length of pattern), Figs. 22 to 26. Merely by way of example it may be assumed as the length of a size No. 12 sole pattern, generally accepted in the trade as 12¾ in.

If now length LP is measured angularly around the drum (clockwise in Fig. 22) at the radius R the point is reached as indicated by the upper arrow, at the top in Fig. 22, marked "Length of pattern (sole) measured from start, around drum axis, on the radius R (drum to the top surface of material at Start position)."

As noted, the radius R¹, to the outer surface of the collars 12, is substantially less than the radius R. Hence if the same pattern length LP is measured clockwise from the start line but at the radius R¹ (with respect to which the contour and dimensions for the collars 12 must be determined), we would reach a point, angularly of the drum, as indicated by the second arrow from the top in Fig. 22 and the associated legend "The same pattern length LP if measured on radius R¹."

Thus the collars 12, to be calculated at the cylindrical surface C, must be shortened in length by an amount equivalent to the angle between the radii marked by said arrows at the top in Fig. 22. Otherwise stated, the working length of the collars 12 must correspond to the length LP as measured on the larger radius R but projected radially inward onto the surface C having the lesser radius R¹. This working length for the collars, from the start line, is indicated at the point E. It will be referred to as the length LC (working length of collars). It is indicated on Fig. 22 by the curved arrow to the point E and the associated legend "Working length of collars, being length LP projected inward onto outer surface C of collars (on radius R¹)." For purposes of comparison this collar length LC is indicated at the bottom of Fig. 22 in relation to the work strip W, as laid out in the plane thereof, rearwardly from the start line at the stop pins 37.

By the above procedure as explained with reference to Fig. 22 the working or active blade-positioning length for the collars 12 is determined for any particular size of sole pattern, such as the men's size No. 12 of the example. But we are here dealing with curving cut lines and with sinuous blades for forming them, and the curvature concerned is different at the two sides of the given sole pattern. In projectively reducing the pattern length LP to the collar length LC at the base of the blades, a definite relation must be maintained as between the curvature of the pattern sides and the resultant curvature for the corresponding longitudinal sides of the collars (circumferentially of the drum). Hence all points along the sinuous pattern side contours must be similarly projected. The manner of accomplishing this, and the resultant markedly different side contours and widths for the collars 12, for any given sole pattern size, will now be explained by reference to Fig. 24.

In Fig. 24 the actual pattern for two soles disposed side by side and reversed heel to toe is represented by the heavy dotted lining (the longer areas). In other words, the heavy dotted outlines are the contour and dimensions as desired for the actual product of the cutting operation. The modified shapes and dimensions for the corresponding cutter drum collars 12 are represented by the full outlines. The method concerned is the same for any size and shape of pattern. Those of Fig. 24 are the largest within the space requirements of the drawing sheet and approximate men's No. 9 or 10 soles, but will be understood as not necessarily to exact scale.

The horizontal line extended dotted at the foot of Fig. 24 and marked "Start" represents the same starting point as in Fig. 22, with the leading edge of the pattern and of the work strip abutting the stop pins 37. The pattern length LP of Fig. 22 extends in Fig. 24 from the bottom start line to the uppermost dotted line, as indicated by the dotted arrows. The corresponding reduced or projected working length LC for the collars, arrived at as explained with reference to Fig. 22, is measured from the same start line and extends to the uppermost full line, which represents the other end of the particular collars 12. This working collar length is indicated by the full line arrows and associated characters LC.

The total difference in the two lengths LP and LC, represented by the space between the top dotted line and the top full line, is the required longitudinal reduction, to be interpolated into the shorter collars 12 with simultaneous maintaining of the corresponding width values for all points lengthwise the patterns. This total difference is designated as D. In accordance with the invention this length difference D is divided into equal parts or increments the number $n$ of which is so selected that each incremental part will be not greater than about $\frac{1}{16}$ in. Otherwise expressed, D in inches divided by $n$ equals about $\frac{1}{16}$ in. ($D/n = \pm \frac{1}{16}$).

Using the same value for $n$, the total pattern length LP is divided into $n$ equal parts. These equal-length pattern increments, indicated on Fig. 24 by the dotted horizontal lines, are designated Ip (increment of pattern length LP). Otherwise expressed $LP/n = Ip$. Similarly the total reduced length LC for the collars is divided into the same number of equal parts, each indicated on Fig. 24 by the full horizontal lines, and designated Ic (increment of collar length LC). The difference between the $n$th part Ip of the pattern and the $n$th part Ic of the collar, represented between the first dotted and the first full horizontal lines above the bottom starting line, is the interpolating increment, designated $i$. It is equal to one-$n$th of D ($D/n = i$). In the diagrammed example of Fig. 24 the value selected for $n$ is 12, to make $i$ equal approximately to $\frac{1}{16}$ in. Therefore $Ip = LP/12$, $Ic = LC/12$, and $i = D/12$.

The Ip dotted lines are numbered at the left from 1 to 12 consecutively, and the corresponding Ic full lines are numbered 1 to 12 consecutively, and the corresponding Ic full lines are numbered 1' to 12'. It will be seen that the length relation or spacing between any corresponding pairs of dotted and full Ip and Ic lines 1–12 and 1'–12' is obtained by the formula $xIp - xIc = xi$, being the ordinal of the particular Ip and Ic lengths counting back from the starting line as zero. For instance, for the lines 3 and 3' the spacing is $3i$, approximately $\frac{3}{16}$ in. in the example.

It remains to determine the side contour points for the collars, for corresponding longitudinal positions on the patterns. For this a perpendicular is dropped from each Ip dotted line 1–12, at the points $a$ of its intersections with the pattern contours, to the next adjacent lower Ic full line $1'$-$12'$. The intersections $b$ of the perpendiculars and the $1c$ full lines determine and locate corresponding collar side-contour points.

All the points $b$ along the same collar side are then connected by smooth sinuous curves. These define the desired configuration for the collars, which however are subject to a further width modification to be described with reference to Figs. 25 and 26. It will be noted in Fig. 24 that the resultant lateral dimensions for the collars, in the direction axially of the cutter roll in their installed positions, are by way of increase or of decrease depending on the direction of the curvature of the corresponding side lines of the sole patterns S(P).

Referring now to Figs. 25, 26, these illustrate a further step in the construction method of the collars 12, for whatever size and shape of pattern. The outer dotted side lines of Fig. 25 represent the projected collar sides as arrived at by the procedure of Fig. 24. They are the same as the full-line contours in said Fig. 24. This resulting dotted-line collar width, Fig. 25, is then slightly reduced, at each side edge of the collar 12, to the extent indicated by the full lines in Fig. 25. This is to compensate for the thickness of the blades 11.

As shown on the corresponding scale in Fig. 26 the blades 11 each include an inner radial portion 11$x$ of uniform thickness, such portion extending from the angular base flanges 11$a$ through between the adjacent collars 12 and for a further distance equivalent to the described clearance above the work, between the outer surface C of the collars 12 and the adjacent surface of the work strip W (the upper face of the work in the operating position as in Fig. 22). The outer radial portions of the blades, the portions which pass through the work and which have a radial extent at least equal to the thickness of the work, are formed with a taper, which may be differential at the two sides of the blades, relatively steeper and shorter at one side as at $c$, Fig. 26, and longer and more gradual at the opposite side as at $d$. In other instances, depending somewhat on the nature and thickness of the work-strip material, the blades may have an equal bevel at both faces, or may be truly radial or non-bevelled at one face, with all the bevel at the opposite face.

Referring again to Fig. 25, narrow marginal portions are cut off from the collar 12 at either or both sides thereof, depending on the particular blade for which they are intended. In the example of Fig. 25, corresponding to a blade structure as in Fig. 26, a portion is removed along the left side of the collar as at $c$ in Fig. 25 and a complemental portion is removed at the right as at $d$ (which as noted may be zero). The narrow compensating zone or zones of material removed from the collar width resultant from the Fig. 24 determination is uniform along the entire working length of the collar. That is, the final resultant curving side lines for the collar, shown by the full lines in Fig. 25 are respectively parallel to the corresponding dotted line, at least throughout the entire working length of the blades. It will be understood that "working length" of the collars refers to the portion which is to lie along and laterally locate the active cutting length of the blade which penetrates the work, corresponding to the given pattern length; it excludes the inturned clamping flanges and any areas between the latter and the "working length." Such areas, with relatively short patterns, are equivalent to the difference between the "working length" and the circumference of the supporting drum surface (herein about 180° of the drum); see particularly Fig. 23, noting the positions of the blade ends. In this connection it will be observed, noting also Figs. 5 to 10 and 15, that the blades desirably extend, oppositely, somewhat beyond the starting and terminus of the cut lines for the given pattern and work strip.

The described manner of formation of the collars, and a series thereof as appropriate for the nine-bladed installation of Figs. 1 to 4, 12 and 13, is further illustrated, in said Fig. 23, in the developed or flat condition of the collars. The knives or blades 11 are represented as if installed. The additional sheet metal or other material beyond the toe and heel ends of each collar, that is, beyond the actual LC or working length, is seen between the second and third horizontal lines from the top and bottom respectively. The material along the top and bottom borders in Fig. 23, between the edges and next adjacent lines, is that to be inturned to form the collar-clamping end flanges, Figs. 12 to 21. For any given machine and diameter of the overall length of each collar, as from top to bottom in Fig. 23, will be the same for all patterns, approximately one-half the drum circumference at its stationary and movable sections 160 and 165 in the example here shown. This drum diameter is calculated so as to accommodate the largest pattern size or sole length within the range capacity desired for the particular machine.

The blades or knives 11 which perform the initial non-rotary entry and locking cuts followed by the penetrating progressive curving cut lines and the attendant feeding of the material, have been briefly described in connection with the various assembly views. They may be either of L-shape or of inverted T-shape in section, in any case preferably including angularly related portions, in two mutually perpendicular planes, as represented by the radial blade portion and the angular base or flange portion at least at one side. The single- or double-tapered blade-edge formation has been pointed out with reference to Figs. 25 and 26, as at $c$ and $d$ therein, radially beyond the inner or straight-walled blade portion 11$x$.

In Figs. 27 to 32 the blades are shown separately on a larger scale, in two alternative constructions, more fully to disclose their demountable and interchangeable character, as individual articles of manufacture, and their capacity to be conformed to any required sinuous pattern line around the supporting cutter drum. The blades are formed from sheet metal stock of appropriate gauge and of a composition affording the desired capacity for flexing in shaping and in installing the blades but presenting adequate rigidity in operation, with requisite toughness and wear-resistance to meet the pressure and other requirements in cutting the relatively thick stiff or semi-flexible work strips here concerned, generally natural leather. By way of example, the blade stock may be a good grade of machine steel, case hardened after forming or for heavier jobs and greater wear-resistance on a given job the blades may be of tool steel and treated in oil.

Referring to the L-section blades as in Figs. 27 to 29, the initial straight flat stock strip or bar is milled or otherwise slot-recessed transversely, along one longitudinal margin, at a multiplicity of spaced locations as at 11$a^1$, to provide a corresponding series of similar lateral flange tongues $11a^2$ of equal or other area. The width of the lateral slots or recesses $11a^1$ is calculated to accommodate the maximum degree of curvature, with the tongues $11a^2$ at the inner or concave side of the curve, likely to be required for any sinuous pattern line, without overlapping at the convergent free portions of the tongues, as at the lower half of Fig. 28. After edge-slotting the blade strips, or previously if preferred, they are bent angularly along approximately their longitudinal median line, to give the desired L-form in cross-section. The blades are then arched lengthwise on the radius of the cutter drum at the outer faces of the drum sections 160, 165 and with the non-slotted cutting portions of the blades disposed in the radial plane. Here again if preferred this arcuate bending operation for drum conformance may be performed at an earlier stage.

The resulting blade element, before lateral bending to the particular pattern form, is represented in Fig. 27. Each blade is then shaped by lateral bending to the general S or sinuous curved form for the particular pattern. In this connection a master shaping guide, similar to and having the exact edge curvature of the corresponding positioning collar 12, or one of the collars themselves, is employed. The outer radial edge portion of the blade is machined, ground or otherwise formed to the wedge sectional shape, with either single or double taper as described in connection with Figs. 25 and 26, either before or after one or more of the described forming steps.

The resultant arcuate, laterally curved radially-bladed cutting instrument is represented in Fig. 28, and in section in Fig. 29 in its installed position on a drum 10. The latter figure includes a typical blade section, as at any point longitudinally of the blade and through one of the flange tongues $11a^2$.

Figs. 30 to 32, corresponding respectively to Figs. 27 to 29, show a modified blade construction, including two series of flange tongues $11a^{2'}$, one at each side face of the blade proper. The flange tongues of one series desirably are staggered with those of the other series, substantially as illustrated. In this case the blade 11' as a whole may be formed from a one-piece blank having the base-forming portion of a thickness for dividing and turning angularly in opposite directions to the inverted T-form as in Fig. 32, or the blade and one or both double-flange portions may be separately formed and united as by welding.

It has been pointed out that the ends of the work strips W, particularly where these are natural leather, are likely to be irregular. To assist the operator in locating the work transversely of the machine, for maximum economy of material consistent with cutting a complete pattern at the gauging end of the pattern series across the machine, end-gauging means desirably is herein provided, at either or both ends of the cutter drum.

One such gauge is seen in Figs. 2 and 4, herein at the left as generally more convenient, and on a larger scale in Fig. 33. It comprises an elongated curved index bar or gauge proper 200 adapted to extend fore and aft at the front of the machine in approximate line with the first cutter blade and so as to parallel it in the starting position of the cutter drum. The gauge is demountably supported, herein at its end nearer the cutters, in a manner for readily interchanging it with others, for cooperation with different patterns. Accordingly it has an attaching hub 201 at its inner end received on a stud or pivot on a boss 202 fixed stationary part, herein the work table 35. As seen in Fig. 4 the gauge has a depending positioning stop for seating on a shoulder of the boss 202 to present the gauge in the operative horizontal position of Fig. 4, and allowing it to be swung up away from the table when desired. The curvature of the gauge, as viewed in plan in Fig. 33, is the same as that of the corresponding blade and sole pattern. Desirably a set of interchangeable gauges 200 is provided, for the various patterns.

In the partly diagrammatic Fig. 33 the work strip as a whole is indicated at W, with an intermediate section broken away. Average irregularity is shown at the ends of the strip, assumed as natural leather. The direction of travel of the strip through the cutting means is indicated by the large arrow pointing toward its leading long-side edge, at the top of the figure. The actual cutting lines for the several soles of the given pattern are shown dotted. The gauge 200 is accurately located with respect to one end blade position (left end of drum) desirably slightly outside (to the left of) the actual cut line, for tolerance purposes.

Thus the gauge indicates where the cut line will come across an underlying strip W. The end irregularity of the latter is represented in this example as generally inclining to the right away from the drum. In the diagrammed position of Fig. 33 the work strip has been aligned in starting position for the cutting cycle, with its leading edge, at the top of the figure, abutted against the stop pins 37 of the cutter drum. In this instance the strip is set with the left end of its front edge laterally outside the gauge 200 and is adjusted lengthwise (crosswise of the machine and work table) to give minimum lateral projection of leather under the gauge at the outermost cutting point (indicated by the small arrow p) yet with leather opposite all points along the gauge. This insures that a complete pattern will be cut, at the left end of the sole series, with a minimum of scrap. In cases where the strip-end irregularity inclines oppositely from that in Fig. 33, that is, so that the leading edge terminates more to the right than the trailing edge, the work may readily be gauged by locating the left end of its leading edge with respect to the adjacent portion of the left-end blade 11 and similarly checking for leather underlie at all points along the curve line of the gauge.

From the foregoing description taken in connection with the illustrative drawings, it will be apparent that the invention comprises novel methods and means whereby work strips of substantial thickness, particularly natural leather and analogous materials, may be simultaneously cut along a plurality of sinuous or other curving lines to form in side-abutting relation a corresponding plurality of articles such as cut soles, of a length which is the width of the strip. In the course of each intermittent operating cycle the work strips are advanced to and past rotary cutting means, with the strip sides (the longer strip dimension) paralleling the axis of rotation and perpendicular to the feed path for the work. The operating principles and the mechanism for carrying out the methods of the invention make practical provision for progressive rotary-cutting the planar work-strips, through the medium of lineally curving or sinuous blades disposed radially of and adapted to a cylindrical surface generated about the axis of cutter rotation. At the same time provision is made for clearance between any moving cylindrical or other part associated with the cutting instrumentalities themselves, on the one hand, and the adjacent face of the work, on the other hand, whereby compacting, ironing, marking and other undesirable effects are avoided. Further, the simultaneous plurality of curving cut lines are initiated non-rotatively and the work is interlocked with the cutting instrumentalities in a manner insuring its positive feeding advance.

My invention either as to method or means is not limited to the particular steps and embodiments as herein illustrated and/or described by way of example, its scope being pointed out in the following claims.

I claim:

1. In the manufacture of soles of leather and other material of comparable thickness and cut-resistance, that improved process which includes the steps of presenting and advancing sidewise along a given work plane a work strip of the sole-forming material, subjecting the strip to a roll cutting action simultaneously along a plurality of sinuous lines in the general direction of its sidewise advance, and automatically correlating the sinuosity of the cut-lines to both the roll cutting action and the planar advance of the work strip thereby to afford accurately predetermined shapes and dimensions of cut soles.

2. In the manufacture of soles of leather and other material of comparable thickness and cut-resistance, that improved process which includes the steps of presenting along a planar work path a strip of the sole-forming material of a width equal to the sole length and of a length at least equalling a given plurality of sole widths, and rotatively cutting the strip in the direction of its width simultaneously along curving lines spaced lengthwise the strip so correlated to the axis of rotative cutting and to the strip thickness as to form the corresponding plurality of laterally shaped soles of accurately dimensioned pattern.

3. That improved process for forming soles from approximately rectangular work strips having a width equal to the sole length and having a length at least equal to a multiple of the sole width, which process comprises the following steps: presenting such strip sidewise, in the direction of its width, compressively and non-rotatively entering a plurality of blades through the leading side edge of the strip at points spaced lengthwise along it, thereby to initiate through cut lines; and extending the through cut lines along sinuous paths completely across the strip by progressive rolling penetration thereof by the blades while continuously advancing the strip in said direction of its width.

4. In the manufacture of soles of leather and other material of comparable thickness and cut-resistance, that method which comprises the following steps: cutting from hides elongated rectangular strips of a width equalling the desired sole length and of a length to provide a plurality of soles side by side; presenting the strips sidewise to and penetratively engaging them with a series of coaxial rotary blades while angularly immobile; rotating the blades about the common axis thereof and advancing and progressively cutting simultaneously from each strip a plurality of soles in side by side contiguous relation and for which the long side edges of the strips define the toe and heel end edges; and effecting the presenting, advancing and cutting operations for each succeeding strip as an intermittent automatically terminating cycle initiated at the operator's will.

5. That improved method of cutting right and left soles from leather and like strips, which comprises the steps of presenting such strips sidewise along a work path, entering curvilinear blade means non-rotatively into the leading side edge of the strip at points spaced transversely of the path by increments corresponding to toe and heel widths alternately, and then progressively rotating the blade means and lineally advancing the strip sidewise so as to cut the entire thickness thereof transversely along curvilinear lines from said entering points continuously to the trailing side edge thereby to form in the one operation a plurality of alternated right and left soles in toe-to-heel relation and as to which all cut lines except for the outside edges of the outermost soles are common to two adjoining soles.

6. Multiple curvilinear cutting apparatus for sole strips and the like, comprising, in combination, a cutter roll having a series of axially-spaced sinuous radial blades, a cooperable bed roll, said rolls having an inactive relatively open position and an active relatively closed position for engaging and advancing strips between the blades and the bed roll and progressively through-cutting them, means to drive the cutter roll, and means initially to close the rolls sufficiently to penetrate the cutter-roll blades through and interlock them with the leading edge portion of a strip to be cut.

7. Multiple curvilinear cutting apparatus for sole strips and the like, comprising, in combination, a cutter roll having a series of axially-spaced sinuous radial blades, a cooperable bed roll, said rolls having an inactive relatively open position and an active closed position for engaging and advancing strips between the blades and the bed roll and progressively through-cutting them, drive means for the cutter roll including a control clutch therefor, roll-closing means and a clutch-controlled drive therefor, and means whereby the cutter-roll clutch is automatically engaged following actuation of the roll-closing means.

8. Multiple curvilinear cutting apparatus for sole strips and the like, comprising, in combination, a cutter roll having a series of axially-spaced sinuous radial blades of less than 360° angular extent, a cooperable bed roll, said rolls having an inactive relatively open position and an active closed position for engaging and advancing strips between the blades and the bed roll thereby progressively to cut the strips transversely, means for relatively moving the rolls non-rotatively to active position, a power source, operator-controlled means including a one-revolution clutch for operatively connecting the power source and the roll-moving means, drive connections including a one-revolution clutch between the power source and the cutter roll, and means actuated by the operator-controlled means for throwing in the cutter-roll clutch.

9. A machine for simultaneously cutting from hide strips a plurality of laterally adjoining soles alternated as rights and lefts and heel-to-toe, comprising, in combination, opposed parallel cylindrical cutter and bed drums, means rotatably supporting the drums for radial movement of one toward and from the other, means for presenting a hide strip sidewise between the drums, rotary cam mechanism, drive gearing and associated one-cycle clutches for the cam mechanism and for the cutter drum, connections whereby the cam mechanism controls the cutter-drum clutch, other connections between the cam mechanism and the supporting means for the radially movable drum, and a manual control for initially actuating the cam clutch.

10. A machine for cutting an elongated workstrip simultaneously along a plurality of curving lines spaced lengthwise of the strip, comprising, in combination, a pair of opposed elongated cylindrical cutter and supporting elements to receive and advance the strip sidewise, means rotatably mounting said elements for relative transverse movement to and from operative cutting and feeding relation, a cam shaft and cam means for effecting said movement, power-operated drive gearing, clutch mechanism respectively between the drive gearing and one of the rotary elements and between the drive gearing and the cam shaft, and clutch-control means whereby to activate the cam shaft for relatively moving the rotary elements to operative relation, to impart one revolution to the gear-driven element, and to return said elements to and halt them in starting position.

11. In a machine of the class described, an elongated cylindrical cutter presenting a plurality of axially-spaced radial curvilinear blades, drive gearing and a controlling clutch for the cutter, a bed drum transversely movable non-rotatively toward and from the cutter and at times rotatable with the latter, power-driven mechanism for moving the bed drum toward the cutter, and means for automatically engaging the cutter clutch in timed relation to the transverse movement of the bed drum.

12. In a machine of the class described, a rotary cutter drum comprising a supporting shaft, axially spaced hubs keyed thereon, a part-cylindrical elongated drum section extending between and fixed to the hubs, a complemental drum section angularly movable on the hubs, a plurality of arcuate collars receivable externally on the drum sections and having angularly-spaced holder means engageable with opposed longitudinal portions of the fixed and the movable drum sections respectively, and means for moving the movable drum section to and locking it in collar-retaining relation to the fixed drum section.

13. For a machine of the class described, rotary cutting mechanism comprising in combination: a supporting drum including fixed and circumferentially movable longitudinal sections; and a demountable blade assembly comprising a series of arcuate and curvilinear blades for mounting radially of the drum, a corresponding series of arcuate blade-positioning collars for seating on the drum sections, one collar at each side of each blade, a pair of holding bars and associated clamping means for removable attachment along respective longitudinally aligned ends of the collars; and longitudinal seating formations for the holding bars along angularly spaced portions of the fixed and the movable drum sections respectively.

14. Rotary cutting mechanism according to claim 13 including locking cam means at the fixed drum section cooperable with the movable drum section for locking the blade assembly angularly of the drum.

15. Rotary cutting mechanism according to claim 13 including opposed end flanges for the drum constructed and arranged for longitudinal abutting and circumferential overlapping engagement with the respective ends of the blade assembly, one of said flanges including a transversely removable circumferentially interrupted key.

16. For progressively rotatively cutting leather and the like along curving pattern lines, a generally parti-cylindrical annular cutting element comprising an elongated metal strip angularly formed along its approximate longitudinal median line to provide a blade and a flange in mutually perpendicular relation and being longitudinally arcuately formed for mounting on a cylindrical surface with the blade radial and the flange circumferential thereof, and the blade being laterally curved along a base line so determined with respect to the inner portion of the blade adjacent the flange as to provide for rotative cutting at the radially outer blade portion along a curving pattern line as to which said base line is an inward projection of the pattern line onto a cylindrical surface adjacent and paralleling the flange.

17. In the manufacture of curvilinear articles such as soles from leather and other sheet material of similar thickness and cut-resistance, that novel cutting method which comprises presenting the material in a work path, non-rotatively forcing selected angularly aligned portions of each of a concentric series of spaced curvilinear arcuate blades through corresponding points along the leading edge of the material and thereby locking the blades into it, and rotatively moving the blades about the common center of their arcs so as to advance the material by reason of the engagement of the blades therewith while simultaneously progressively through cutting the material along separate curving lines, one to each blade.

18. The method according to claim 17 wherein adjacent curvilinear cut lines are relatively reversed lengthwise thereof and alternate cut lines are mutually parallel.

19. In a machine of the class described, in combination, a frame, a radial-bladed rotary cutter having a fixed axis on the frame, a cooperable bed roll having a supporting shaft paralleling the cutter axis, guideways on the frame at the ends of the bed-roll shaft to guide the latter for movement toward and from the cutter, a rider slidable in the respective guideways, inner guides on each rider, a bearing block movable on each inner guide and rotatively bearing the corresponding end of the bed-roll shaft, and adjustable spacing means between the respective bearing blocks and riders thereby variably to set the bed roll in spaced relation to the cutter independently of the relation of the riders thereto.

20. In a machine of the class described, in combination, a frame, a radial-bladed rotary cutter having a fixed axis on the frame, a cooperable bed roll having a supporting shaft paralleling the cutter axis, guideways on the frame at the ends of the bed-roll shaft to guide the latter for movement toward and from the cutter, a rider slidable in the respective guideways, bearings for the bed-roll shaft carried by the respective riders with capacity for adjustment in the latter in the direction radially of the cutter, a cam shaft paralleling the bed-roll shaft and having cam means for the respective riders, and cooperative cam followers on the riders, for moving the bed roll toward and timing its return from the cutter.

21. In a machine for simultaneously cutting from leather and the like sheet material a plurality of articles such as soles in side-by-side relation, in combination, a frame, an upper cutter drum and a lower bed drum rotatable in opposed relation on the frame, the cutter drum having a variable number of transverse radial blades variably spaced to cut the sheet material into separate articles, one between each two adjacent blades; the bed drum cooperable with the cutter blades to advance the material between the drums and to deliver the cut articles beyond them; and article-distributing means on the frame comprising for each interblade position a downwardly inclined chute having its upper end disposed at the article-delivering space between the drums, each chute including laterally opposed guide portions relatively adjustable for articles of different widths, and the plurality of chutes being variably positionable lengthwise the drums to accommodate different numbers of articles cut simultaneously.

22. In a machine according to claim 21, the alternate chutes of the article-distributing means being constructed and arranged as separate sets in different inclined planes, one above the other, and depressor means at the adjacent back portions of the drums for guiding alternate articles into the corresponding chutes.

23. In a machine according to claim 21 supporting means for the delivery chutes comprising crossed link pairs pivotally joined into an extensible parallel linkage system, the opposed guide portions of each chute being pivoted at the inter-pivoted ends of alternate crossed link pairs, a supporting bar paralleling the drums, and a plurality of collars slidable on the bar and respectively pivotally supporting corresponding link pairs at the pivots of their crossing points.

24. In a machine according to claim 21, the alternate chutes of the article-distributing means being constructed and arranged as separate sets in different inclined planes, one above the other, and separate supporting means for each set of chutes, said means for each set being extensible and contractible transversely of the machine to present the corresponding chutes in mutual parallelism in different spacing relations along the drums.

25. That novel method of cutting soles and like curvilinear articles from leather and other material of similar thickness and cut-resistance to provide uniform cut articles of given curved-side pattern and size in side-by-side relation and alternated as rights and lefts, which comprises the steps of presenting the material of given thickness flatwise upon a supporting surface defining a work plane, presenting at the leading edge of the material a plurality of parti-circular laterally curvilinear blades of uniform radial extent from an axis paralleling the work plane and perpendicular to the work path therein, and with the blade edges tangential to said plane, revolving the blades about said axis and advancing the material along said work plane in such manner that the material and the blade bases at the material face opposite said plane have the same lineal speed, and so correlating the lateral curvature of the blades to the thickness of the material and to the consequent greater lineal speed at the blade edges as to afford the desired predetermined laterally curvilinear pattern for the cut material.

26. The method of claim 25 further including the steps of initially presenting the blades with their edges in spaced relation to the material supporting work plane and bodily shifting them in axial self-parallelism so as to penetrate the blades through the leading edge of the material and into substantial tangency to said plane.

PETER YUKOB.

REFERENCES CITED

The following references are of record in the file of this patent:

UNITED STATES PATENTS

| Number | Name | Date |
|---|---|---|
| 219,617 | Cady | Sept. 16, 1879 |
| 1,095,661 | Moulton | May 5, 1914 |
| 937,331 | Reed | Oct. 19, 1909 |
| 168,011 | Fry | Sept. 21, 1875 |
| 1,505,774 | Fitzgerald | Aug. 19, 1924 |
| 1,005,228 | Juline | Oct. 10, 1911 |
| 1,542,879 | Hires | June 23, 1925 |

FOREIGN PATENTS

| Number | Country | Date |
|---|---|---|
| 14,518 | Germany | Aug. 2, 1881 |